United States Patent
Taguchi

[19]

[11] Patent Number: 5,937,086
[45] Date of Patent: Aug. 10, 1999

[54] COLOR COMMUNICATION APPARATUS AND METHOD

[76] Inventor: Tomishige Taguchi, c/o Canon Kabushiki Kaisha, 30-2, Shimomaruko 3-chome, Ohta-ku, Tokyo, Japan

[21] Appl. No.: 07/955,017

[22] Filed: Oct. 1, 1992

[30] Foreign Application Priority Data

Oct. 4, 1991 [JP] Japan ................................. 3-257798
Aug. 27, 1992 [JP] Japan ................................. 4-228335

[51] Int. Cl.$^6$ ............................................ H04N 1/46
[52] U.S. Cl. ...................... 382/165; 358/500; 358/508
[58] Field of Search .................... 358/500, 539, 358/504, 508, 426, 468; 382/164, 165; 345/183, 203; H04N 1/46

[56] References Cited

U.S. PATENT DOCUMENTS

| | | | |
|---|---|---|---|
| 4,317,136 | 2/1982 | Keyt et al. ........................... | 358/256 |
| 4,635,101 | 1/1987 | Nakayama ............................ | 358/76 |
| 4,819,063 | 4/1989 | Sugiura et al. ...................... | 358/75 |
| 4,829,569 | 5/1989 | Seth-Smith et al. ................ | 358/426 |
| 4,910,604 | 3/1990 | Takei et al. ......................... | 358/310 |
| 4,974,071 | 11/1990 | Maeda ................................... | 358/80 |
| 5,134,487 | 7/1992 | Taguchi et al. ..................... | 358/209 |
| 5,220,417 | 6/1993 | Sugiura ................................ | 358/75 |
| 5,251,020 | 10/1993 | Sugiyama ............................ | 358/500 |
| 5,274,474 | 12/1993 | Medina ................................ | 358/468 |
| 5,388,167 | 2/1995 | Koga et al. ......................... | 382/50 |
| 5,493,415 | 2/1996 | Mita et al. .......................... | 358/468 |

OTHER PUBLICATIONS

Xerox 3010 Facsimile Terminal Operator Manual (p. 13) May, 1990.

*Primary Examiner*—Kim Yen Vu

[57] ABSTRACT

In a color communication method and apparatus, a desired standard format is designated from among predetermined standard formats on the transmitting side, and the designating information is transmitted to the receiving side along with color image data. As a result, a standard format is read out of a standard-format memory in dependence upon the receiving designating information, this standard format is combined with the color image data and the resulting combination of format and image data is delivered as an output.

24 Claims, 22 Drawing Sheets

FIG. 5A

BARGAIN PROPERTY INFORMATION NEWS

PRICE:
AREA:
ROOM ARRANGEMENT:
ADDRESS:
COMMENTS:

PLEASE TELEPHONE ⟶ KOTOBUKI REALTY
03 - 3353 - 5432

PERSON IN CHARGE:

PLEASE VISIT OUR OFFICE.

FIG. 5B

USED-PROPERTY INFORMATION NEWS

PRICE:
AREA:
ROOM ARRANGEMENT:
ADDRESS:
DATE OF CONSTRUCTION:
COMMENTS:

PLEASE TELEPHONE ⟶ KOTOBUKI REALTY
03 - 3353 - 5432

PERSON IN CHARGE:

PLEASE VISIT OUR OFFICE.

BARGAIN PROPERTY INFORMATION NEWS

PRICE : 67,000,000 YEN
AREA : 97 SQ. M.
ROOM ARRANGEMENT : 4LDK
ADDRESS : OMIYA
COMMENTS : 15 MIN. WALK FROM STATION

PLEASE TELEPHONE ⟶ KOTOBUKI REALTY
03 - 3353 - 5432

PLEASE VISIT OUR OFFICE.

PERSON IN CHARGE : TOMISHIGE TAGUCHI

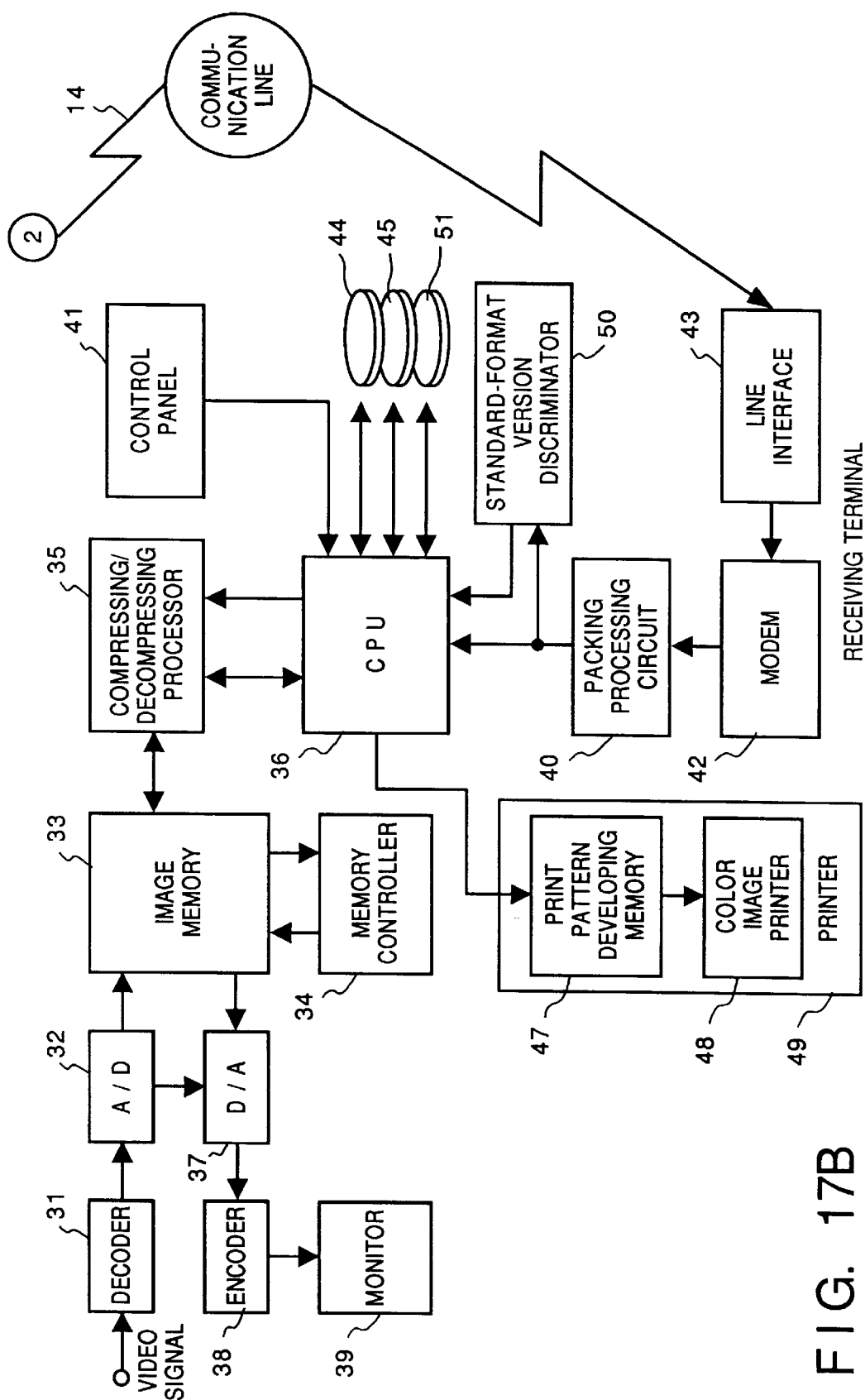
F I G. 17B

COLOR COMMUNICATION APPARATUS AND METHOD

BACKGROUND OF THE INVENTION

1. Field of the Invention

This invention relates to a method and apparatus for communication of color information.

2. Description of the Related Art

An apparatus for sending and receiving still-picture information, for example, is known in which high-speed image transmission is performed by compressing the image information.

In this apparatus for sending and receiving still pictures, however, problems are encountered in that it is difficult to produce a still-picture transmitting and receiving system in which a still-picture video image that is the result of photography on the transmitting side is transmitted to the receiving side together with collateral information appended to the received image, where upon the received image is combined with a print format, which has been stored in the apparatus on the receiving side, and with character information, and the result is printed out automatically on the receiving side, thereby making it possible to create a commodity catalog or an advertisement merely by an operation on the transmitting side.

In a system of this kind, there are cases where the apparatus on the transmitting side is carried about or installed in a vehicle so as to be moved from place to place. There are also instances in which information is sent to the receiving side so that an unspecified number of users may create simple advertisements or commodity catalogs on the receiving side. At such time, it is necessary to increase the kinds of standard formats on the receiving side to accommodate a greater number of users. However, situations arise in which the standard formats are utilized as is without updating the directory of standard formats of an apparatus already in use. In such case, it may not be possible to provide a service in which an output sample conforms to the user's wishes, and a user may make use of an old version of a format without being aware of the fact that the latest standard format has been registered.

SUMMARY OF THE INVENTION

Accordingly, an object of the present invention is to provide a highly versatile color communication apparatus and method in which the apparatus is improved and user convenience is enhanced.

Another object of the present invention is to provide a color communication apparatus and method in which a desired standard format is designated from among predetermined standard formats on the transmitting side, the designating information and color image data are transmitted to the receiving side, a standard format is read out of memory means on the receiving side in dependence upon the designating information, and the read standard format is capable of being printed out in combination with the color image data on the receiving side.

Still another object of the present invention is to provide a color communication apparatus and method in which, when designating information for designating a standard format and the version of a registered standard format differ, the user can be so notified.

Still another an object of the present invention is to provide an image communication apparatus having a new function.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A and 5B are diagrams showing standard formats according to the first embodiment;

FIGS. 17A and 17B are blocks diagram showing a still-picture transmitting system according to a third embodiment of the present invention;

DESCRIPTION OF THE PREFERRED EMBODIMENTS

Preferred embodiments of the present invention will now be described in detail with reference to the drawings.

First Embodiment

Figure 1A:
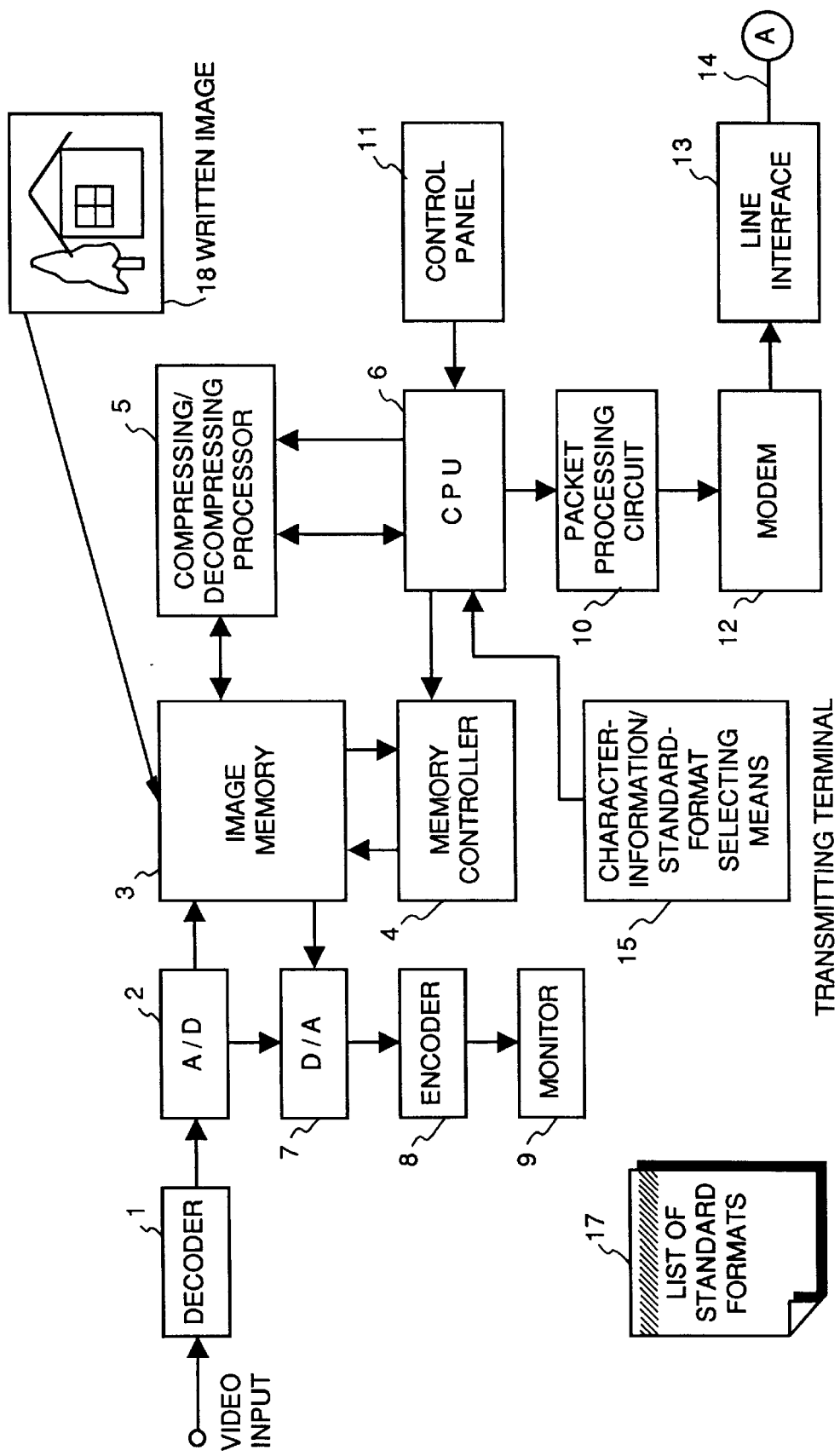
FIGS. 1A and 1B are block diagrams showing a still-picture transmitting system according to a first embodiment of the present invention.
Figure 1B:
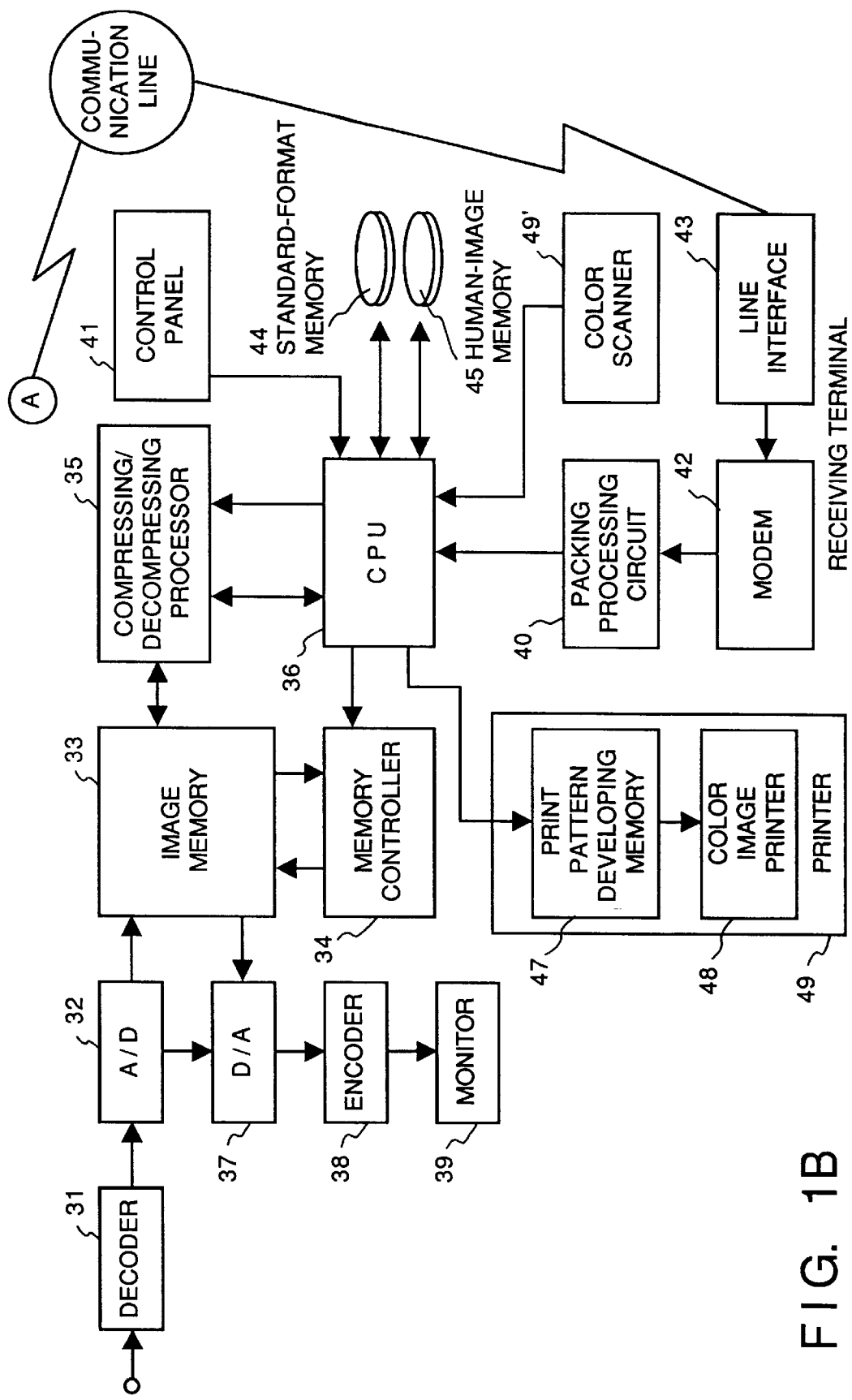

FIGS. 1A and 1B are block diagrams showing a still-picture transmitting system according to a first embodiment of the present invention. As illustrated in FIG. 1A, the transmitting side of the system includes a decoder circuit 1 for decoding an input video signal which enters from a device such as a video camera or document scanner, an A/D converter 2 for converting the video signal into a digital signal, an image memory 3, having a capacity of, say, one screen, for temporarily storing a digital image, a memory controller 4 for controlling the operation of the image memory 3, and a compressing/decompressing processor 5 for compressing an image, which has been stored in the image memory, so as to reduce the quantity of information for communication. The image data is compressed by the ADCT method, by way of example. Also included are a CPU 6 for controlling the overall operation of the transmitting side, a D/A converter 7, an encoder 8, a monitor 9, a packet processing circuit 10, a control panel 11 having switches described later, a modem 12, a line interface 13, a communication line 14 (in this embodiment, as ISDN will be described as an example of the communication line), and character-information/standard-format selecting means 15. Numeral 17 denotes an example of a display, in which a print sample in a standard format outputted on the receiving side is displayed together with a number-correspondence table, and number 18 denotes an example of an image accepted from the video input unit.

As illustrated in FIG. 1B, the receiving side of the system includes a decoder 31 circuit for decoding an input video signal, an A/D converter 32, an image memory 33, a memory controller 34, a compressing/decompression processor 35, a CPU 36, a D/A converter 37, an encoder 38, a monitor 39, a packing processing circuit 40, a control panel 41, a modem 42, a line interface 43, and a memory device 44 which includes a standard-format memory and a dot-pattern memory for character information. The memory device 44 may store standard formats and character information represented by code data, e.g., a page description language, in addition to dot patterns. Also included are a human-image data memory 45, a print-pattern developing memory 47 for developing a standard format, a received image and received characters into a print format, and a color image printer 48. The memory 47 and printer 48 construct a printing section 49. Numeral 49' denotes a color scanner for inputting the above-mentioned standard format and human image.

In the embodiment described above, the apparatus on the transmitting and receiving sides differ from each other in terms of construction. However, these apparatus can be combined into a single apparatus having both transmitting and receiving characteristics.

The operation of the embodiment constructed as set forth above will now be described with in accordance with FIGS. 1A and 1B.

Writing Transmission Image in Image Memory

When a write switch (not shown) on the control panel 11 is operated, the CPU 6 sends the memory controller 4 a control signal which starts the writing of an image, in response to which the memory controller 4 starts an operation for writing one frame of the video signal in the image memory 3. More specifically, the video image signal, which is selected from an ordinary video camera or a still-video camera, is decoded into a luminance signal and color-difference signals by the decoder 1, and these signals are applied to the A/D converter 2. A base-band video signal accepted in conformity with a conversion clock from the memory controller 4 is successively converted into digital data. The resulting digital data is written in the image memory 3.

The still-picture image data written in the image memory 3 is read at high speed under the control of the memory controller 4 and is converted into an analog signal by the D/A converter 7. The analog signal is then converted into a video signal by the encoder circuit 8, and the video signal is outputted to the monitor 9 so that the still picture may be verified by the operator.

Method of Inputting Character Information

Figure 2:
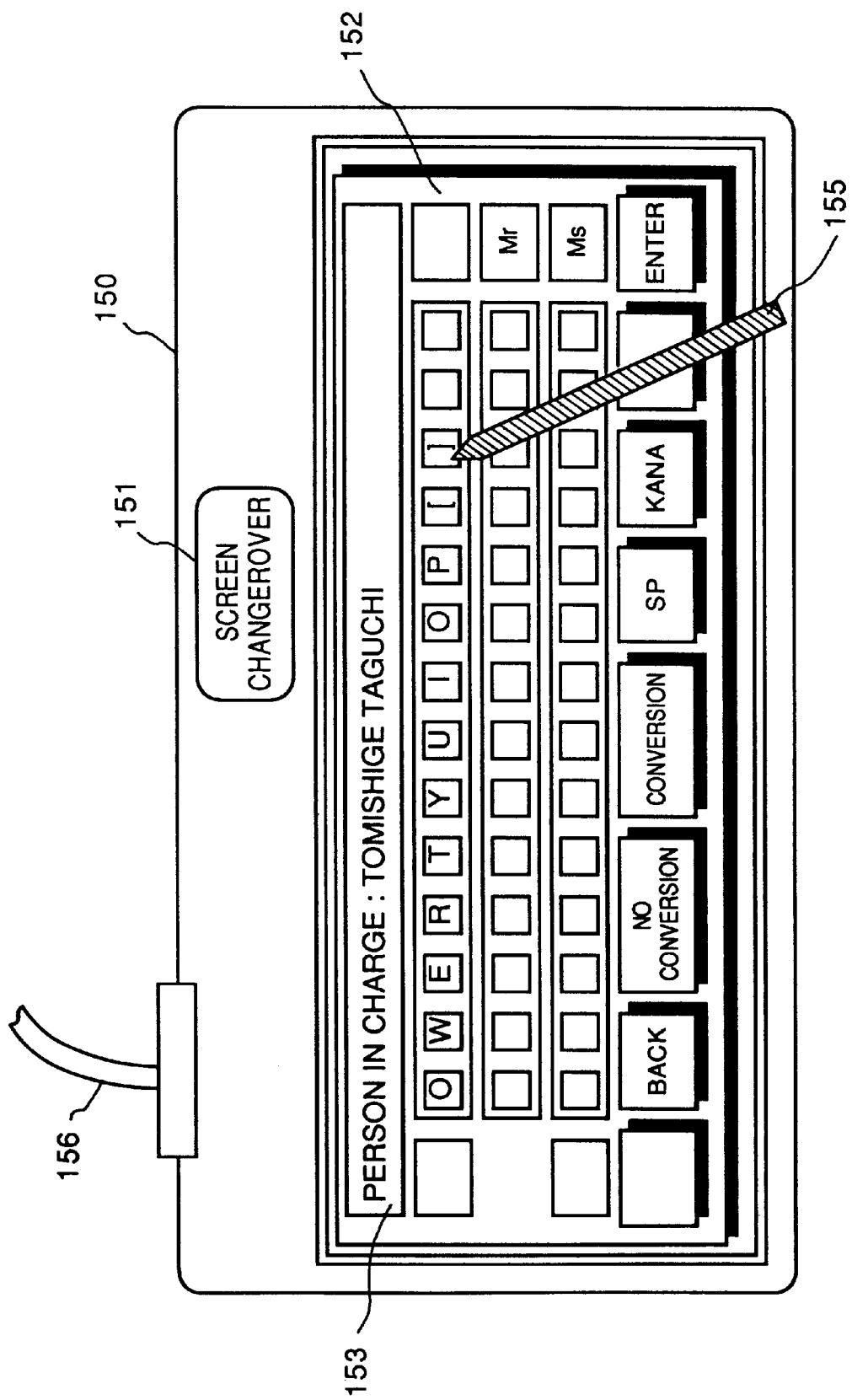
FIG. 2 is a diagram showing a character input screen of character-information/standard-format selecting means according to the first embodiment.

FIG. 2 illustrates a display of keytops on a character input screen of a personal computer used as an example of the character-information/standard-format selecting means 15, as well as an input method, according to the first embodiment.

Figure 3:
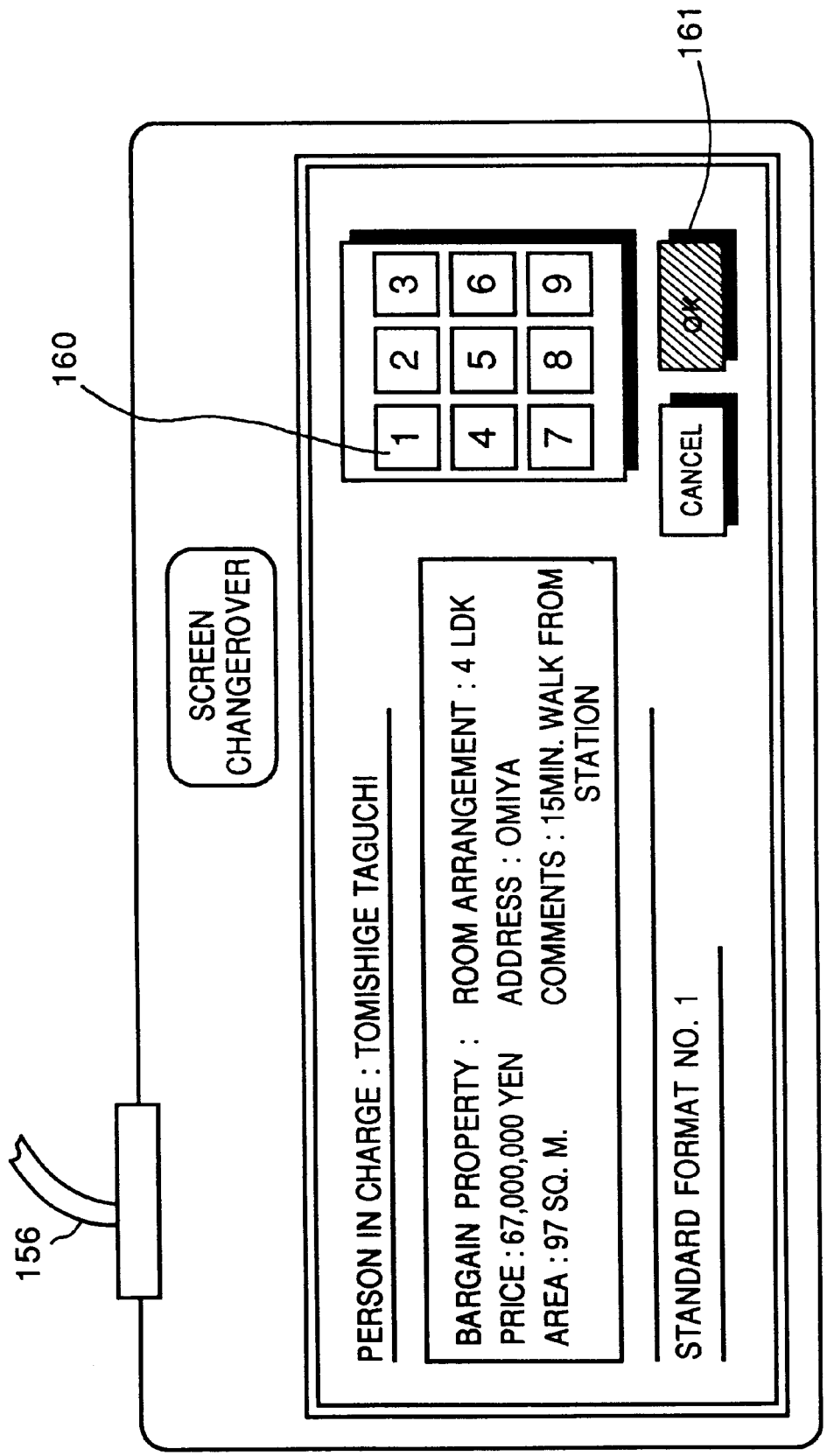
FIG. 3 is a diagram showing an input-item selecting screen according to the first embodiment.
Figure 4:
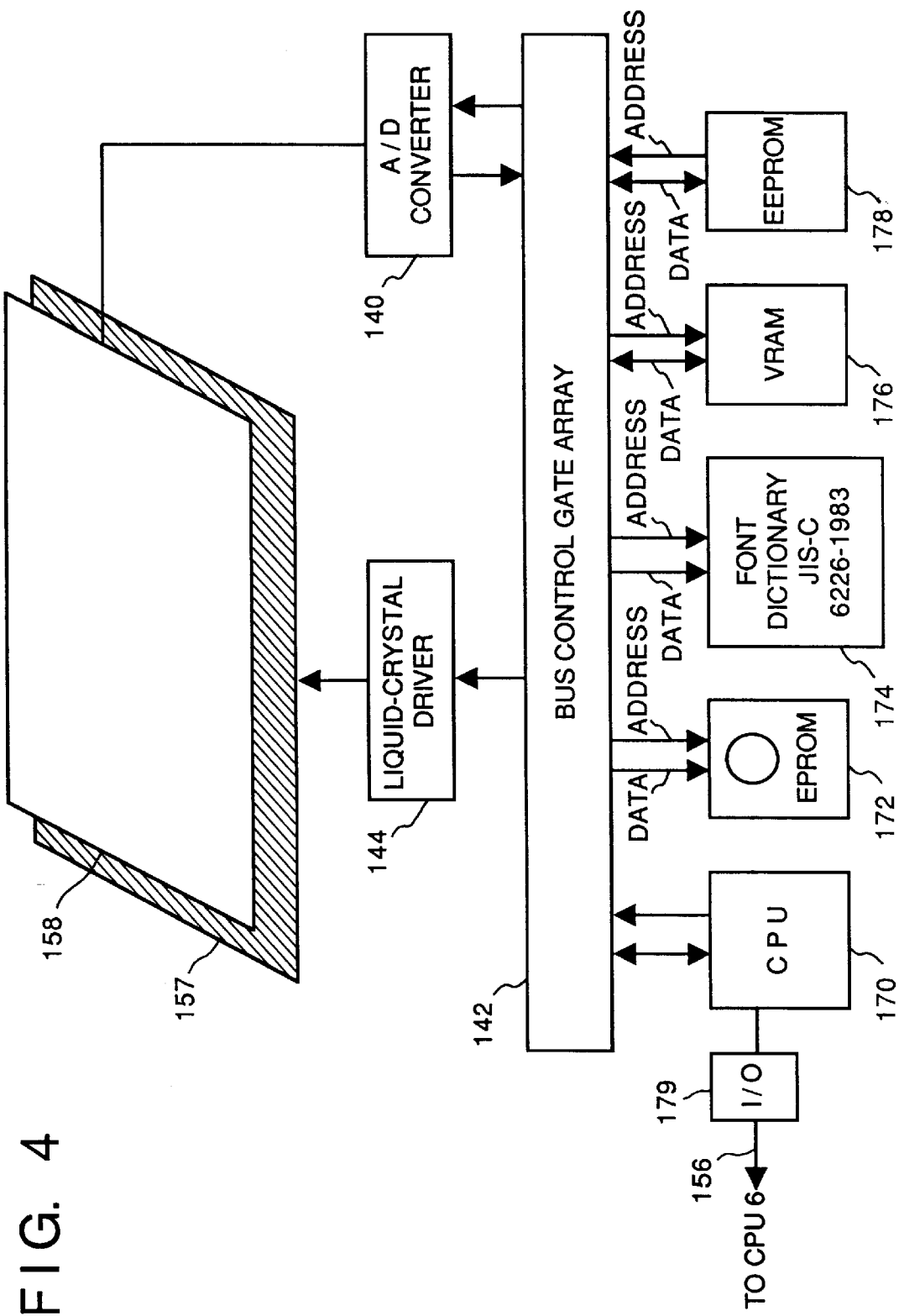
FIG. 4 is a diagram showing the construction of the character-information/standard-format selecting means of FIG. 2.

In FIG. 2, character information selecting means 150 includes a liquid-crystal display 152. As illustrated in FIG. 4, a pen position detector 158 consisting of a transparent material is disposed on a liquid-crystal panel 157. Based upon the position of a keytop, which is displayed on the liquid-crystal screen, pointed to by an input pen 155, a CPU 170 discriminates the type of character inputted through an A/D converter 140 and a bus control gate array 142. The CPU 170 reads the discriminated character pattern out of a font dictionary 174 and stores it in a VRAM 176. The character pattern is displayed on an input-character display section 153 by a liquid-crystal driver 144. If necessary, a kanji conversion or a special character can be inserted. (In this embodiment, kanji codes employ the first level of JIS kanji according to JIS C 6228 1983, by way of example). An EEPROM 178 in FIG. 4 is a memory for storing basic display patterns shown in FIGS. 2 and 3. An EPROM 172 is a memory which stores the program of the CPU 170.

With reference again to FIG. 2, numeral 151 denotes a switch for changing over between the character-input screen and the input-item selection screen. When this portion is designated by the pen 155, the CPU 170 changes over the liquid-crystal display screen to the input-item selection screen shown in FIG. 3. By clicking an "Enter" key using the pen 155, the name "Tomishige Taguchi" is entered in the currently selected item, namely the name of the person in charge.

Next, the method of selecting an input item according to the first embodiment will be described with reference to FIG. 3. A kana/kanji conversion of the kind performed in a word processor may be carried out as the input method.

In this embodiment, there are six input items, namely "Person in Charge", "Price", "Area", "Room Arrangement", "Address" and "Comments", as shown in FIGS. 5A and 5B. When no item has been entered, as is the case immediately after the system has been started up, the item "Person in Charge" will be flashing to indicate the need for an input. An input of information may thus be made in reliable fashion. Basically, an input for a flashing item can be made by using the pen 155 to click a desired character key on the character-input screen of FIG. 2. When the "ENTER" portion of the screen is clicked by the pen 155, the input item can be changed successively from the "Person in Charge" to "Price", "Area", "Room Arrangement", "Address" and "Comments" in the order mentioned. When any item is clicked by the pen 155 in the example of the display shown in FIG. 3, the clicked item begins flashing and characters for this item can be entered in the manner set forth above. When inputs for a series of input items ends, a standard format for print is selected by a standard-format selection key 160.

According to the first embodiment, two standard formats, namely a standard format for bargain-property information shown in FIG. 5A and a standard format for used-property information shown in FIG. 5B, are registered as types of standard formats in the standard-format memory 44 on the receiving side. The user on the transmitting side verifies the desired format from the examples of the print samples of the two standard formats and the number-correspondence table 17 thereof and clicks the key 160 of the corresponding number using the pen 155. In this embodiment, a case in which the standard format of a first bargain property shown in FIG. 5A is selected will be described as one example. As illustrated in FIG. 4, the CPU 170 within the character-information/standard-format selecting means 15 delivers the data to the CPU 6 of the transmitting terminal via an I/O 179 and an interface cable 156.

Transmitting Operation

Figure 8:
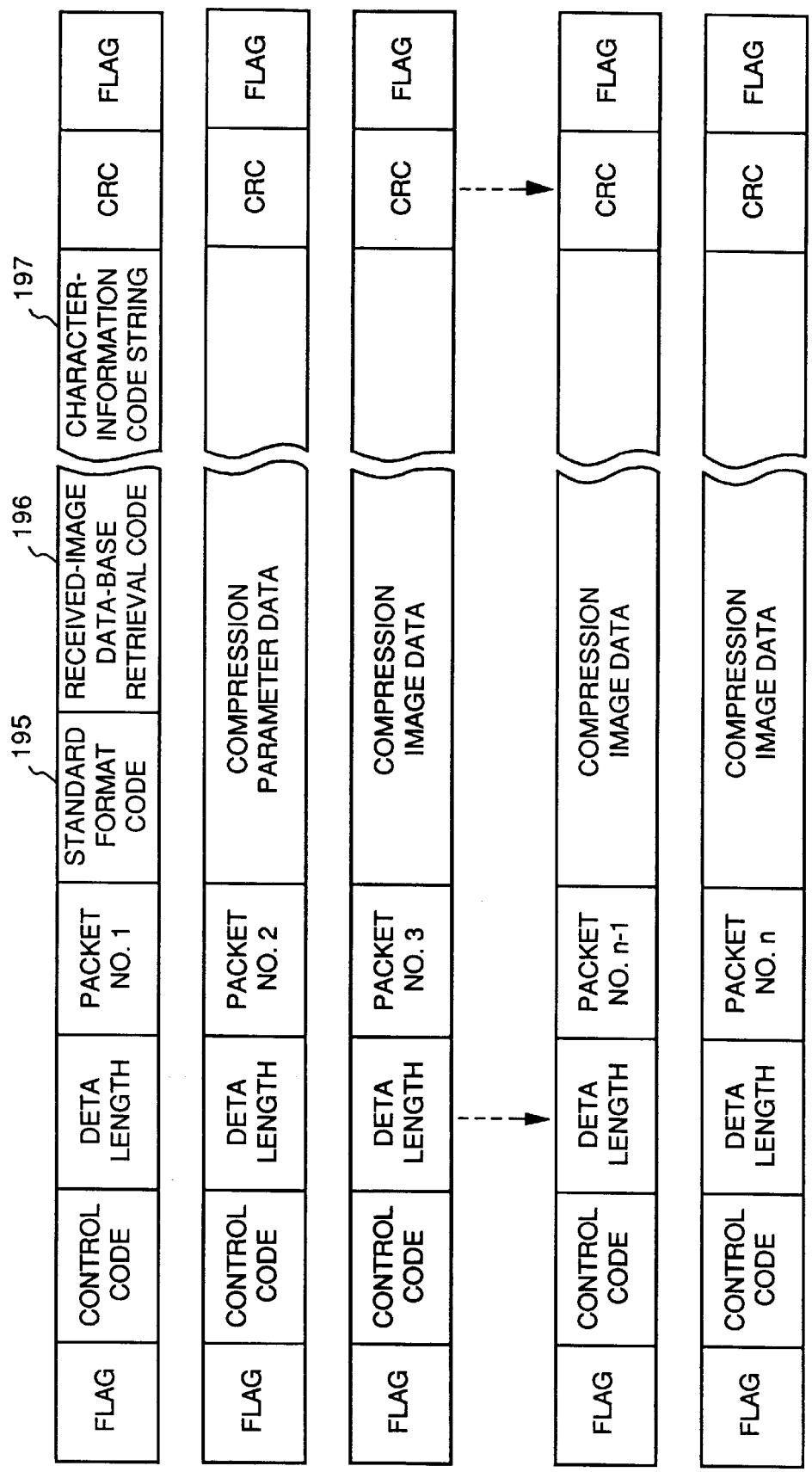
FIG. 8 is a diagram showing a packet data format according to the first embodiment.

When the transmission start key (not shown) on the control panel 11 is operated, the CPU 6 goes to the image memory 3 to successively read out the image 18 that has been written in the image memory 3 by the transmission-image writing operation described above. The compressing/decompressing processor 5 subjects the read image to processing which reduces the quantity of information by compression processing such as ADPCM or orthogonal transformation+quantization+code conversion. The resulting digital data is delivered to the CPU 6. As shown in FIG. 8, a packet-data format according to the first embodiment includes a number (a standard-format code) 195 which selects the standard format, a received-image data-base retrieval code 196 and a character-information code string 197. The digital data is converted into packets by the packet processing circuit 10, modulation conforming to the line is applied to the packet signal by the modem 12, and the resulting signal is outputted to the communication line 14.

All transmissions of character codes in this embodiment are carried out by JIS kanji first-level codes stipulated by JIS C 6226-1983.

Further, in this embodiment the code of the person in charge is used as a retrieval code of the human-image data memory 45, which is a data base of received natural images. According to this embodiment, the person is charge is "Tomishige Taguchi". Therefore, a JIS kanji first-level code, which is stipulated by JIS C 6226- 1983, corresponding to "Tomishige Taguchi" is as shown below. It should be noted that addresses $A_6$~$A_{17}$ are addresses which designate the types of kanji in a case where, say, MB8-4200A-20-21, 022 is used as a kanji ROM.

and the resulting codes are inserted in the character-information code string 197. Further, as shown in FIG. 8, the compressed data is additionally provided with a flag, a control code, a packet number, a CRC (described below) and a flag, which are furnished for each prescribed amount of data, the data is converted into packets and these are transmitted in order.

Operation on Receiving Side

The modulated data from the transmitting side accepted by the line interface 43 on the receiving side via the communication line 14 (which in some cases will pass through an exchange) is demodulated by the modem 42, after which the demodulated data is checked for a CRC (cyclic redundancy check code) by the packet processing circuit 40, whereby it is determined whether the packet has been correctly received or not. Only data in a packet determined to have been received correctly is delivered to the CPU 36, which proceeds to separate the data into a standard-format selection number, a received-image data-base retrieval code and a compressed-image data. The compressed-image data is delivered to the compressing/decompressing processor 35, which subjects the original image to decompressing processing and successively writes the decompressed data in the image memory 33. The image that has been written in the image memory 33 is capable of being verified by the monitor 39, just as done on the side of the transmitting terminal.

Figure 6:
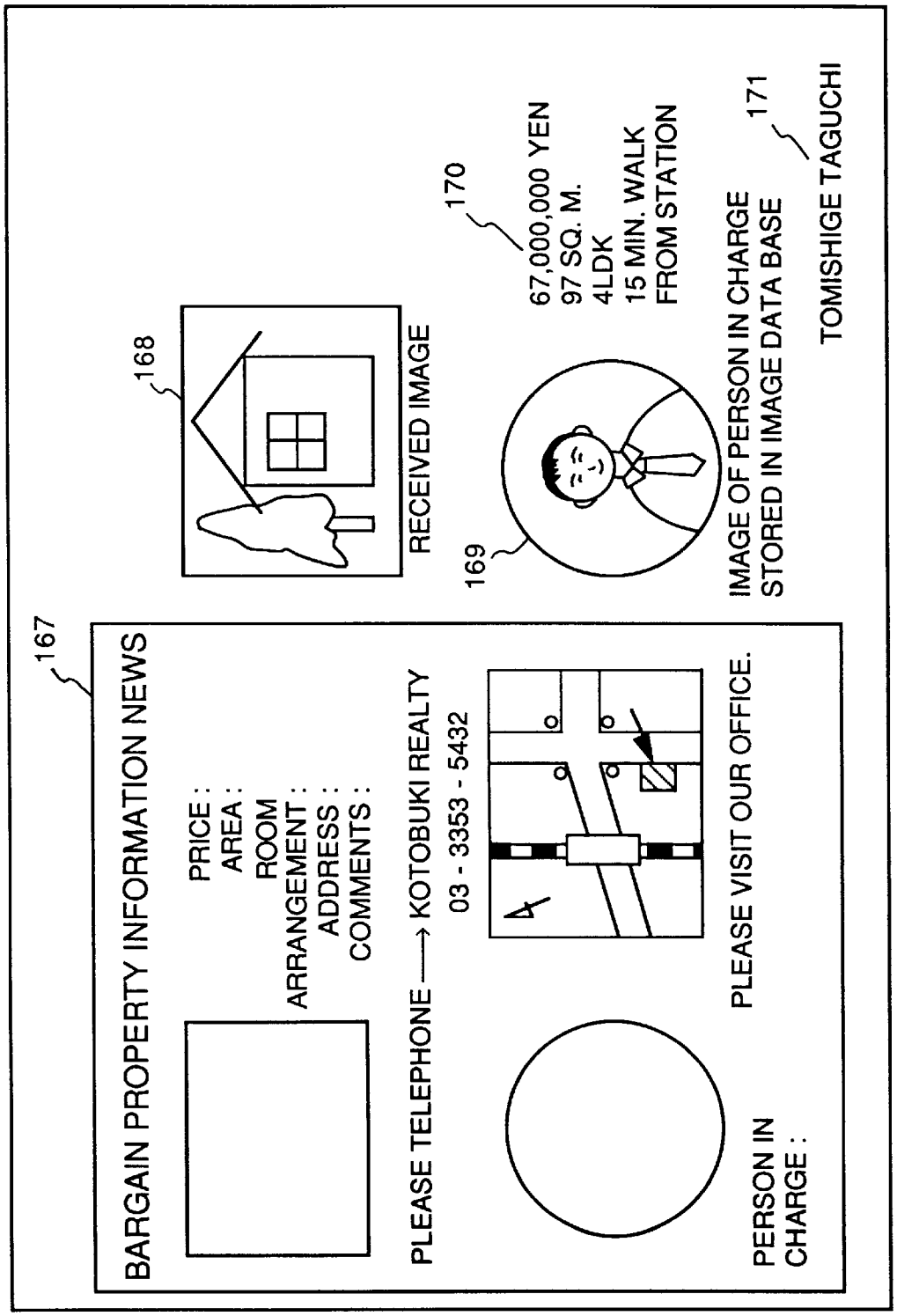
FIG. 6 is a diagram showing a selected standard format as well as received images and received character information.

Meanwhile, the character-information code string 197 is such that the type of character or kanji is specified by the code information, with fonts being developed using either font-dot data or internal font data, which is on the receiving side. For example, the data is dot-font data for explanatory characters 170 and a name 171 of the person in charge, shown in FIG. 6. Further, the corresponding human-image data in the human-image data memory 45 for the person in charge is retrieved from the received kanji character code of the name of the person in charge, the image data indicated by an image 169 (in the image data base) of the person in charge is extracted, and the extracted image data is transferred to a print-pattern developing memory 180 via a

|  | Kanji ROM Address | | | | | | | | | Scan Address | | | | | | | |
| --- | --- | --- | --- | --- | --- | --- | --- | --- | --- | --- | --- | --- | --- | --- | --- | --- | --- |
|  | $A_{17}$ | $A_{16}$ | $A_{15}$ | $A_{14}$ | $A_{13}$ | $A_{12}$ | $A_{11}$ | $A_{10}$ | $A_9$ | $A_8$ | $A_7$ | $A_6$ | $A_5$ | $A_4$ | $A_3$ | $A_2$ | $A_1$ | $A_0$ |
| TA | 1 | 0 | 1 | 0 | 1 | 1 | 0 | 0 | 0 | 1 | 0 | 0 | X | X | X | X | X | X |
|  | 2 |  | B |  |  | 1 |  |  |  |  | 0 |  |  |  |  |  |  |  |
| GUCHI | 0 | 1 | 0 | 0 | 0 | 1 | 1 | 1 | 1 | 1 | 0 | 1 | X | X |  |  |  |  |
|  | 1 |  |  | 1 |  |  |  | F |  |  |  | 4 |  |  |  |  |  |  |
| TOMI | 1 | 1 | 0 | 0 | 1 | 1 | 0 | 1 | 1 | 0 | 0 | 1 | X | X |  |  |  |  |
|  | 3 |  |  | 3 |  |  |  | 6 |  |  |  | 4 |  |  |  |  |  |  |
| SHIGE | 1 | 1 | 0 | 0 | 1 | 1 | 0 | 1 | 0 | 0 | 0 | 0 | X | X |  |  |  |  |
|  | 3 |  |  | 2 |  |  |  | 4 |  |  |  | 0 |  |  |  |  |  |  |

Accordingly, the code for "Tomishige Taguchi", who is the person in charge, is inserted in order in the received-image data-base retrieval code 196 shown in FIG. 8. For a case where transmission is performed in order of MSB, the order is as follows:

"2B1011F433643240"

Figure 7:
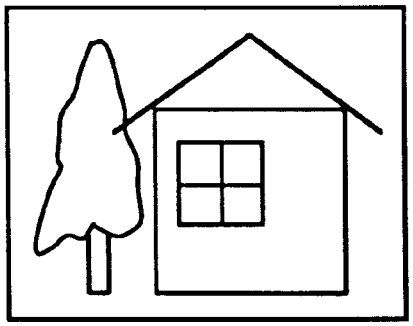
FIG. 7 is a diagram showing an example of a print incorporating the selected standard format as well as the received images and received character information.
Figure 7:
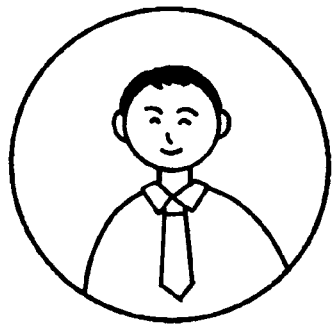
Figure 7:
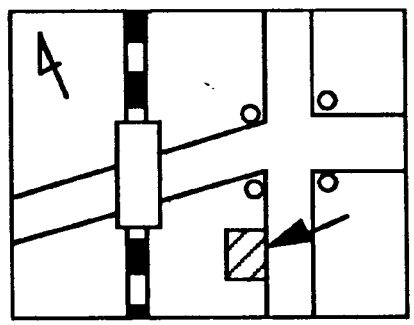
Figure 9:
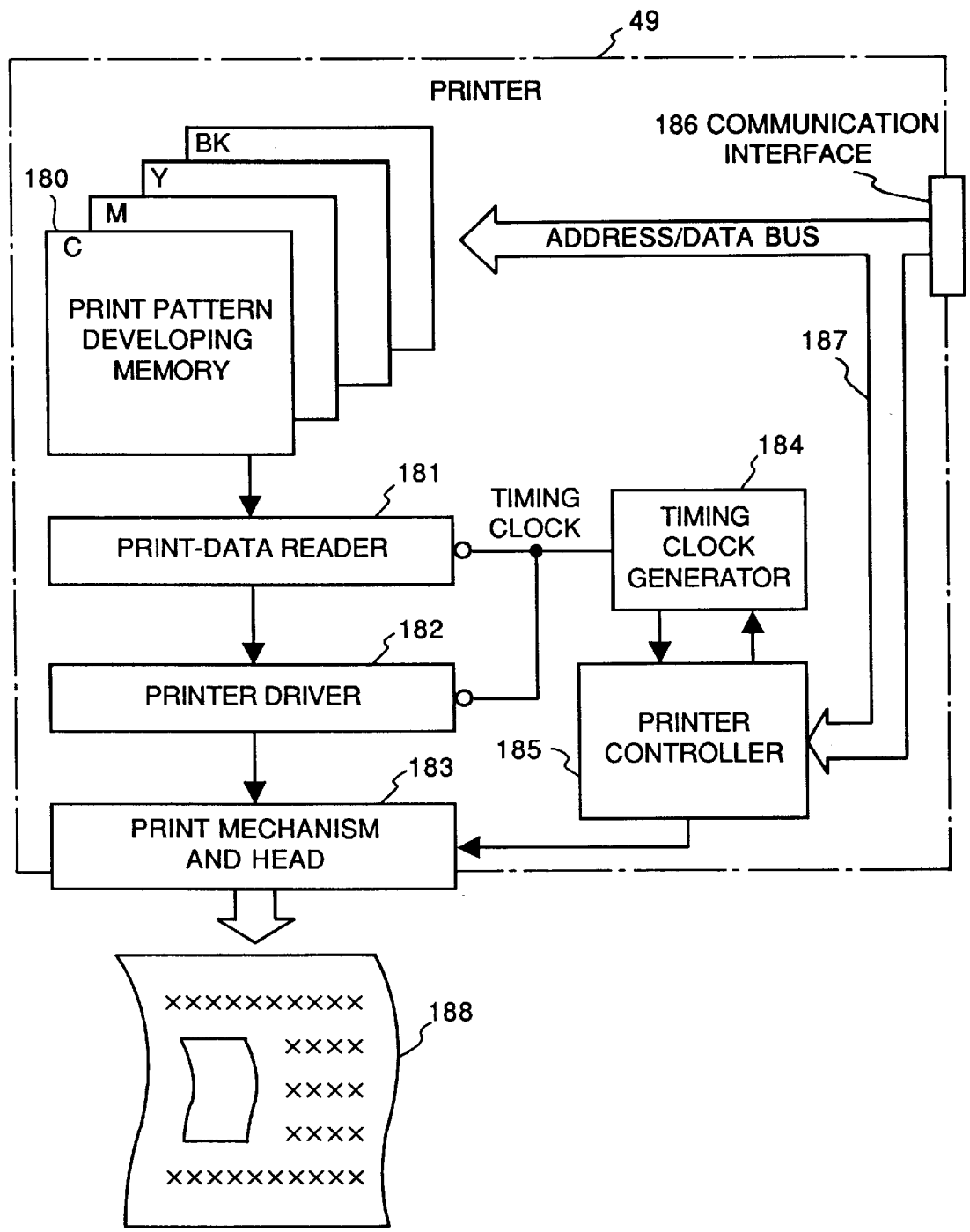
FIG. 9 is a diagram of the detailed construction of a printer according to the embodiment.
Figure 10:
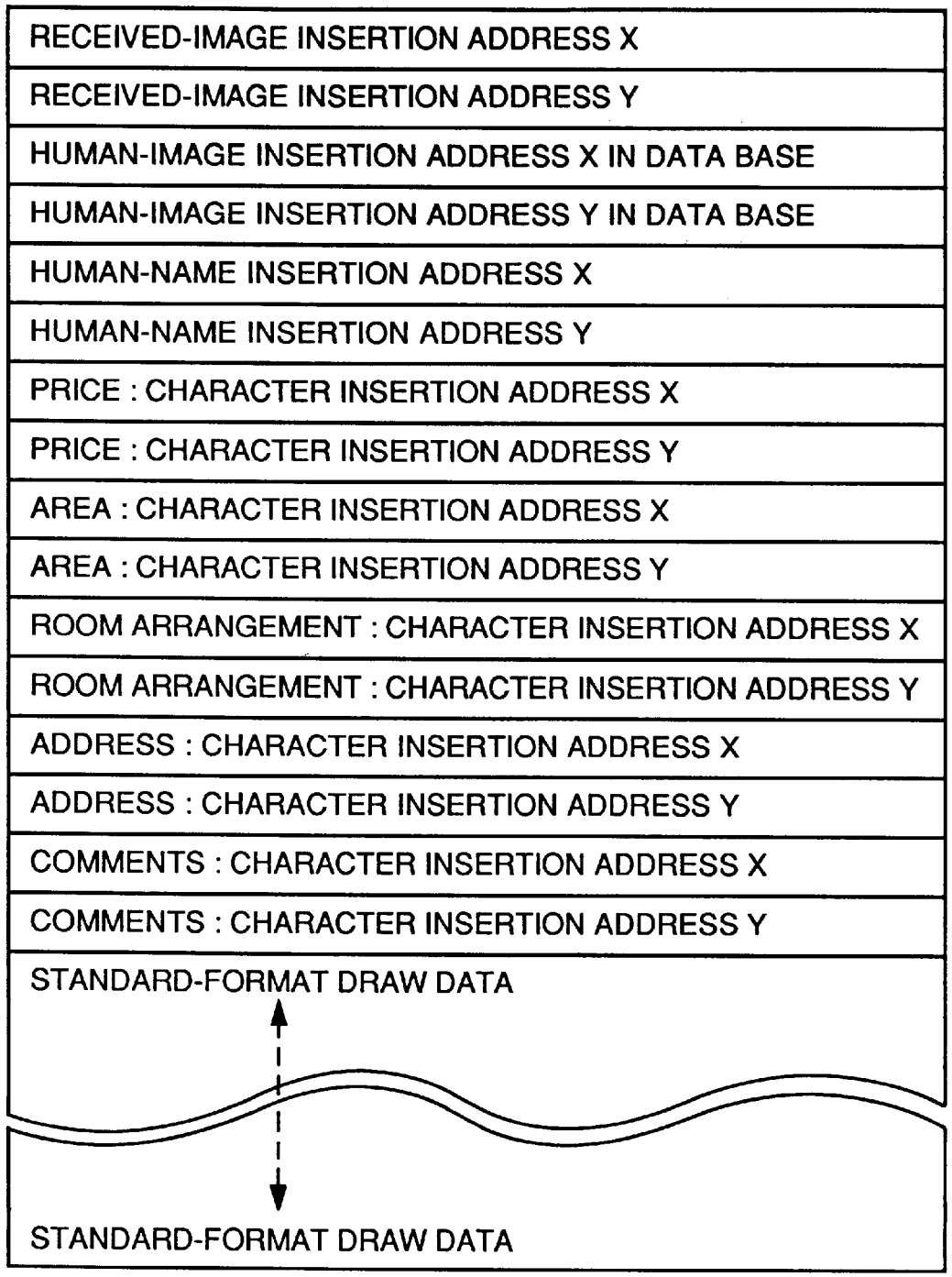
FIG. 10 is a diagram showing the format of a standard-format file according to the embodiment.

The items "Price", "Area", "Room Arrangement", "Address" and "Comments" are converted into kanji codes, printer communication interface 186, shown in FIG. 9. A format corresponding to the standard format selected on the transmitting side is read out of a bargain-property standard-format file in the standard-format memory 44 of FIG. 1B in accordance with the standard-format code 195 shown in FIG. 8. Information indicating how the received image 168 and character information 170 from the transmitting side as well as the natural image 169 from the natural-image memory 45 on the receiving side are to be mapped is recorded in the read standard-format file, as shown in FIG. 8, after which the standard-format information is recorded in a draw format. The image is developed in the print-pattern developing memory 180 of FIG. 9 while reference is made to the above-mentioned mapping information. When the development of all of the print information in the print-pattern developing memory 180 in conformity with this standard format ends, the CPU 36 of FIG. 1B applies a print-start control instruction via the printer communication interface 186 of FIG. 9, thereby causing the color image printer 48 to operate. The completed image of the print can be utilized directly as an advertisement or catalog, as illustrated at 172 in FIG. 7.

FIG. 9 is a diagram showing the details of the printer. Numeral 181 denotes a reader for reading data to be printed out of the print-pattern developing memory 180, 182 a printer driver which outputs a signal for driving a printer head, and 183 the mechanical portion and printing head for printing. Numeral 185 denotes a printer controller for controlling the overall printer in accordance with commands from the CPU 36, and 184 a timing clock generator for controlling the timing of the various components.

Thus, in accordance with the first embodiment, as described above, character information and a selection code for a standard print format, which has been stored on the receiving side, are appended to a video image from the transmitting side and the resulting signal is transmitted to the receiving side, whereby it is possible for the receiving side to automatically lay out a color natural image and character information from the transmitting side in a standard format that is in accordance with the selected format, and print out the result. Furthermore, the print automatically printed out can be utilized in business without any further revision.

Modification of the First Embodiment

Figure 11:
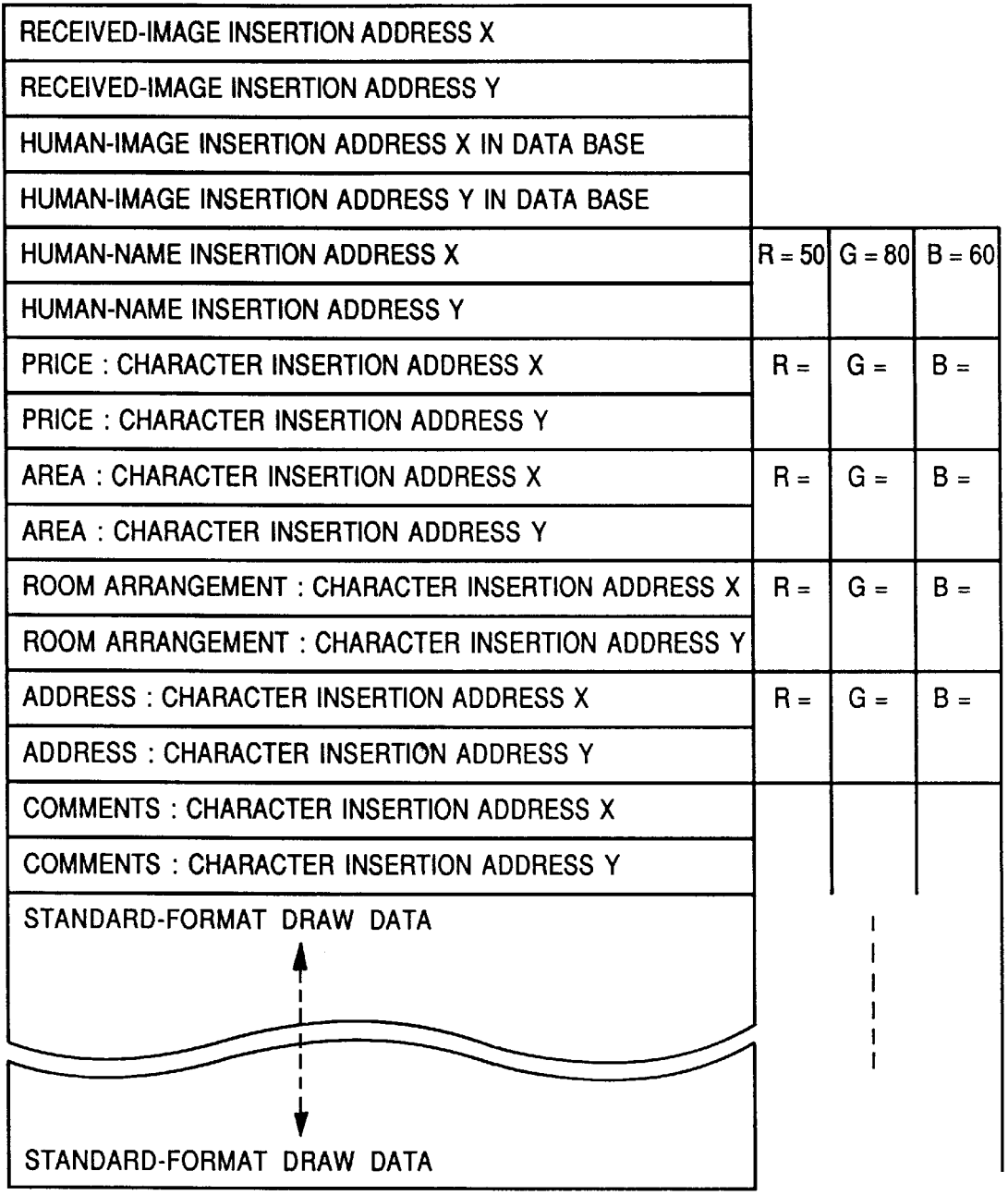
FIG. 11 is a diagram showing the format of a standard-format file according to a modification.

In the embodiment described above, it is permissible to add data which represents the color of each character string, as shown in FIG. 11, to the data which designates the standard format. In a case where RGB data is represented by eight bits in the example shown in FIG. 11, let R=50, G=80, B=60 represent the colors of the character strings which indicate the name of a person. It will suffice if the colors of these character strings are inputted by the character-information/standard-format selecting means 15 shown in FIG. 2. It is permissible to adopt an arrangement in which, say, a color number is decided in advance and the above-mentioned designation of color is decided in dependence upon this color number without designating the values of the RGB data.

Furthermore, the color designation may be performed character by character rather than making the color designation for every character string. In accordance with the data whose color has been designated, the CPU 36 of FIG. 1B controls data written in each of the C, M, Y and Bk planes of the print-pattern memory 47 and executes control in such a manner that the colored characters are printed out.

Thus, a color communication apparatus of even greater versatility can be provided by designating the color of the standard format or the color of the character strings.

Second Embodiment

Figure 12A:
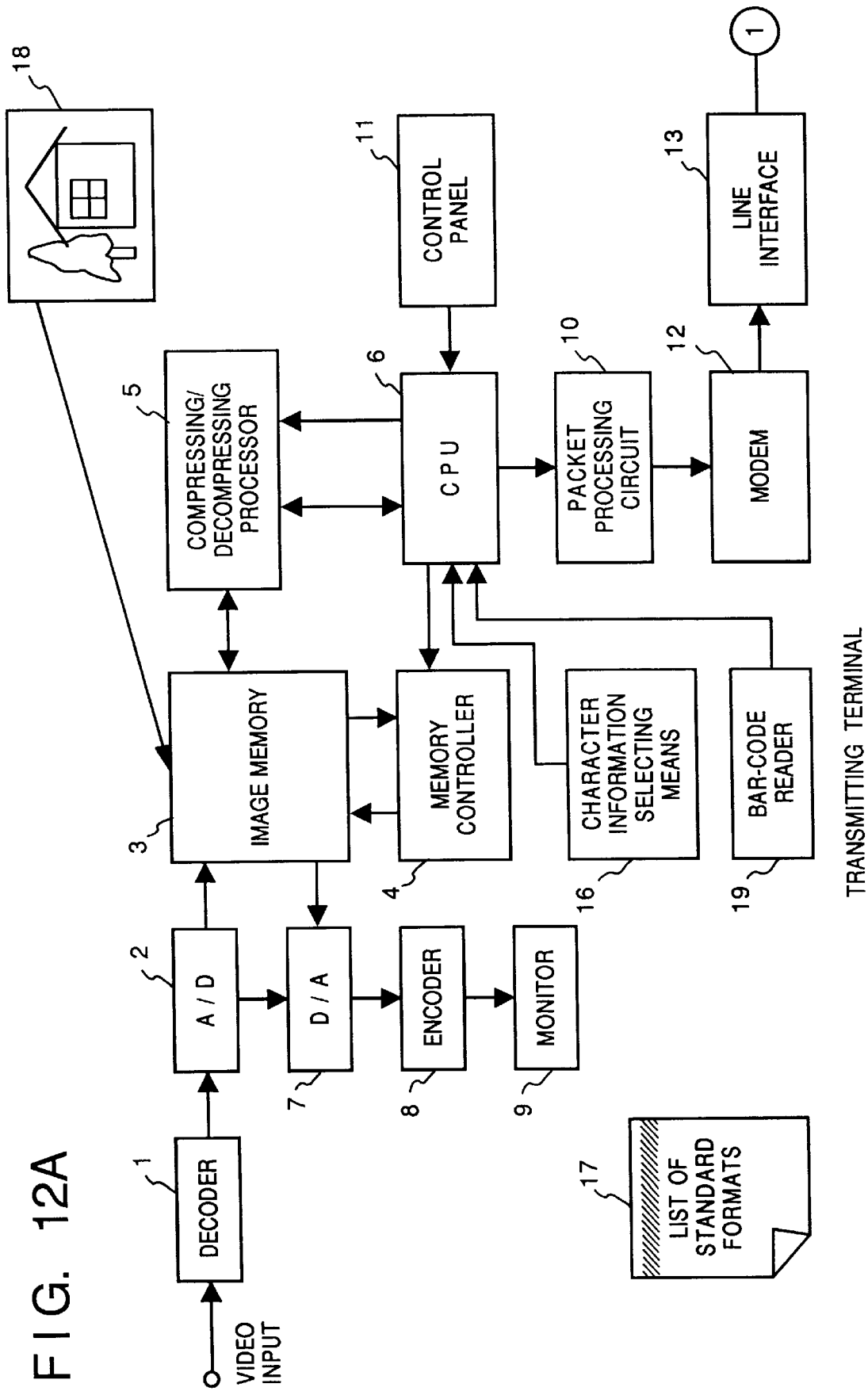
FIGS. 12A and 12B are blocks diagram showing a still-picture transmitting system according to a second embodiment of the present invention.
Figure 12B:
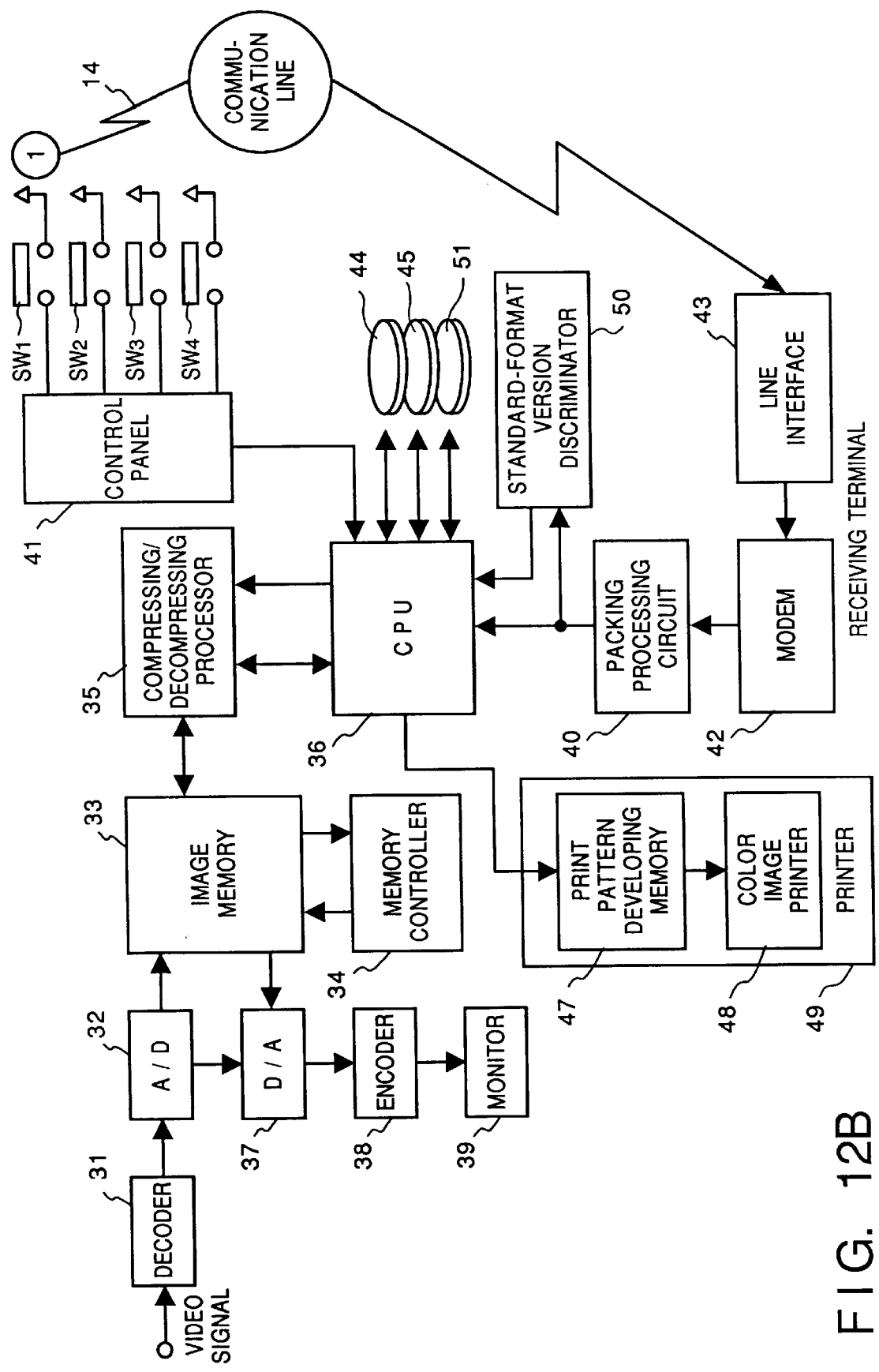

FIGS. 12A and 12B are block diagrams showing a still-picture transmission system according to a second embodiment of the present invention. Components on the transmitting and receiving sides identical with those in the first embodiment are designated by like reference numerals and need not be described again. On the transmitting side shown in FIG. 12A, numeral 16 denotes character information selecting means, and 19 is a bar-code reader. On the receiving side shown in FIG. 12B, numeral 50 designates a standard-format version discriminator, and 51 is a version-code non-conformity memory.

The transmitting and receiving operations in the second embodiment constructed as set forth above will now be described.

The writing of a transmission image in the image memory and the method of inputting character information are as described earlier in the first embodiment. Here a method of selecting input items will be described with reference to FIGS. 13 and 14. The construction of the character information selecting means 16 is the same as that shown in FIG. 4 described earlier, and the character input screen is the same as that depicted in FIG. 2.

Figure 13:
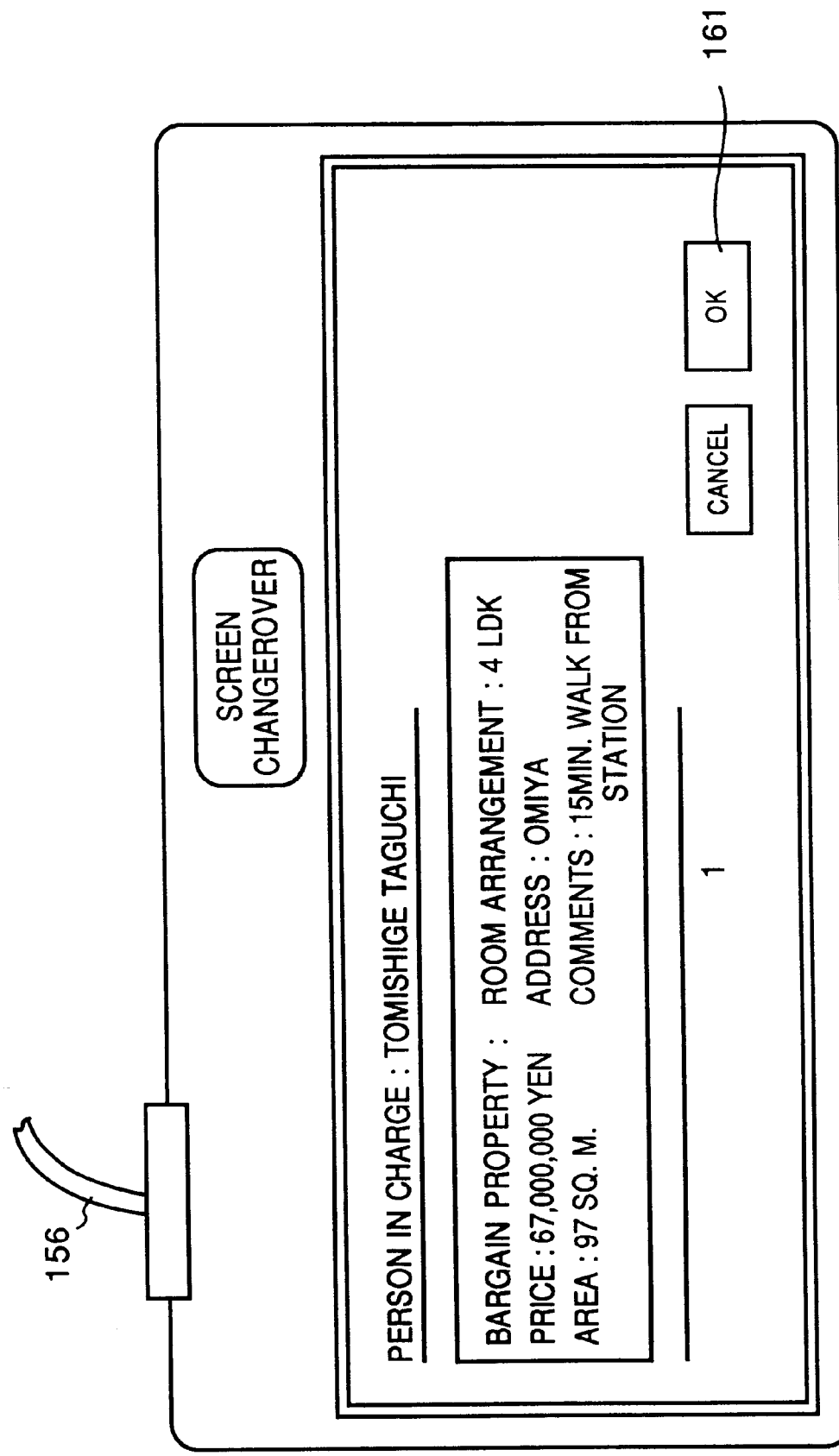
FIG. 13 is a diagram showing an input-item selecting screen according to the second embodiment.
Figure 14A:
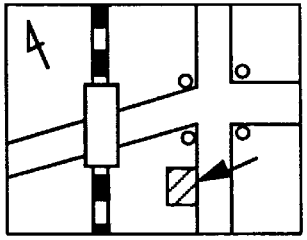
FIGS. 14A and 14B are diagrams showing standard formats according to the second embodiment.
Figure 14A:
Figure 14B:
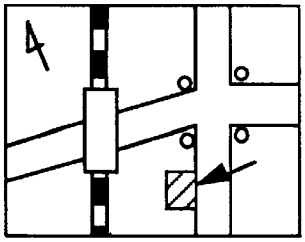
Figure 14B:
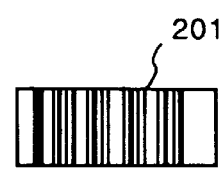

In this embodiment, two standard formats, namely a standard format for bargain-property information shown in FIG. 14A and a standard format for used-property information shown in FIG. 14B, are registered as the types of standard formats in the standard-format memory 44 on the receiving side. The user on the transmitting side verifies the desired format from the examples of the print samples of the two standard formats and the number-correspondence table 17 thereof and wipes a pen of the bar-code reader 19 across a bar code 200 or 201 written at the right of the examples of the standard formats shown in FIGS. 14A and 14B. The bar codes are composed of a code of the version of the standard format example and a code of a standard format selecting number. The bar-code data read by the reader 19 is sent to the CPU 6, where the data is converted into a binary code and then temporarily stored in a register within the CPU 6. In this embodiment, a case in which the standard format of a first bargain property is selected will be described as one example. In this case, as illustrated in FIG. 13, the selected standard format number is displayed on the input-item selection screen. The input of the transmission data is ended by clicking an "OK" key 161.

Transmitting Operation

Figure 15:
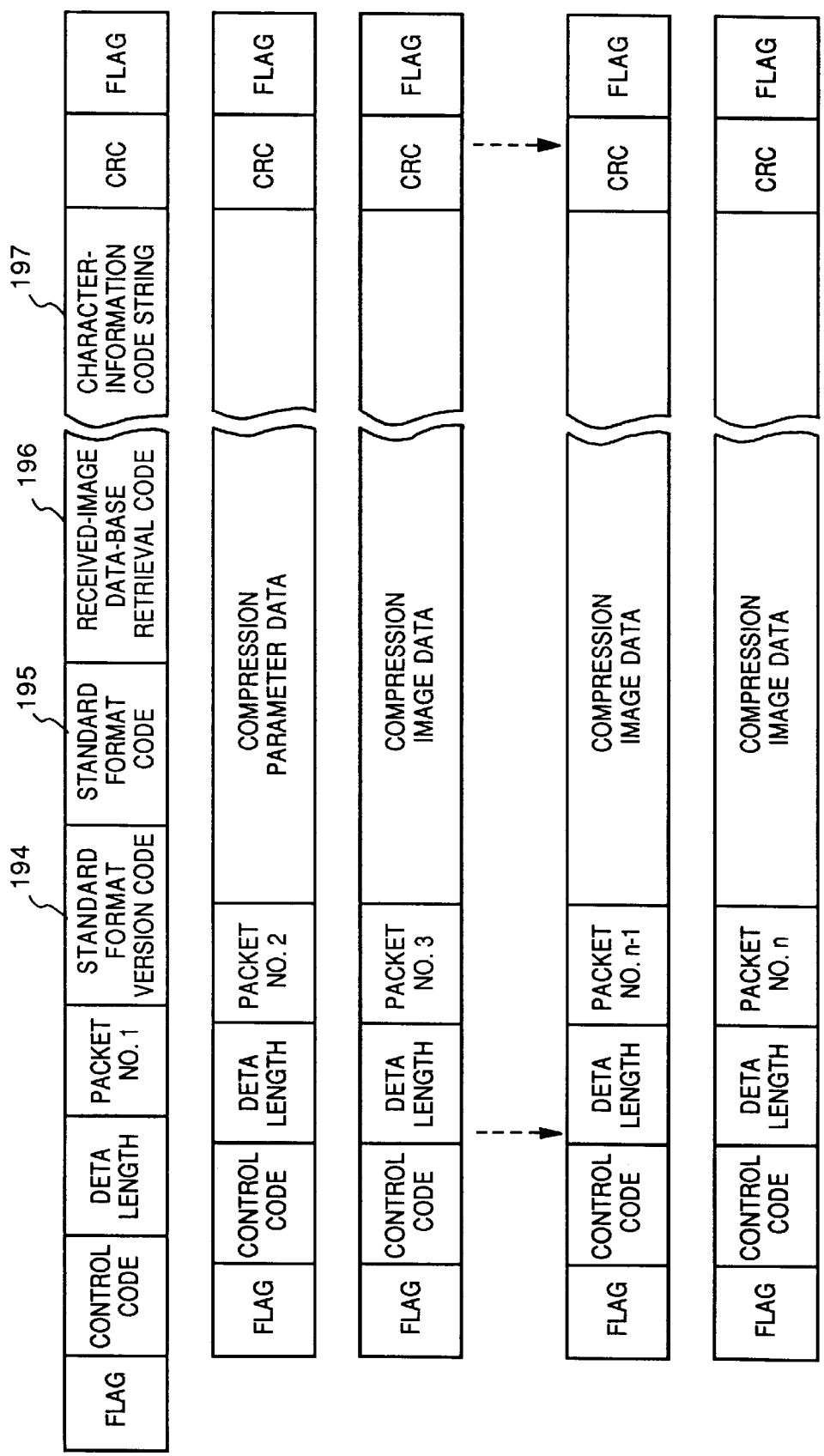
FIG. 15 is a diagram showing a packet data format according to the second embodiment.

When the transmission start key (not shown) on the control panel 11 is operated, the CPU 6 goes to the image memory 3 to successively read out the image 18 that has been written in the image memory 3 by the transmission-image writing operation described above. The compressing/decompressing processor 5 subjects the read image to processing which reduces the quantity of information by compression processing such as ADPCM or orthogonal transformation+quantization+code conversion. The resulting digital data is delivered to the CPU 6. As shown in FIG. 15, a packet-data format according to this embodiment includes a standard-format version code 194, the number (the standard-format code) 195 which selects the standard format, the received-image data-base retrieval code 196 and the character-information code string 197. The digital data is converted into packets by the packet processing circuit 10, modulation conforming to the line is applied to the packet signal by the modem 12, and the resulting signal is outputted to the communication line 14. The character information and the compressed image data are processed in the same manner as described in the first embodiment.

Receiving Operation

As in the first embodiment, only data in a packet determined to have been received correctly is delivered to the CPU 36, which proceeds to separate the data into a standard-format version code, a standard-format selection number, a received-image data-base retrieval code and compressed-image data.

The standard-format version code is delivered also to the standard-format version discriminator 50. Here the standard format version is updated automatically or by an input operation at the time the standard format is registered in the standard-format memory 44, and a comparison is made with the standard format version from the transmitting side. If the comparison shows that the versions are different, information to this effect is delivered to the CPU 36. Upon receiving the information indicating that the versions are different, the CPU 36 stores the received-image data-base retrieval code in the version non-conformity memory 51.

When Standard-Format Version Codes Conform

In this case, processing similar to that of the first embodiment is executed.

When Standard-Format Version Codes Do Not Conform

The CPU 36 stores the received-image data-base retrieval code 196 from the transmitting side in the version non-conformity memory 51. The stored code 196 is read out by operating a version non-conformity verification switch SW4 on the control panel 41 and is converted into a character dot pattern of a person's name by the font dot data on the receiving side. Furthermore, the image developed in the print-pattern development memory 47 can be printed out by the color image printer 48, thereby enabling verification.

Figure 16:
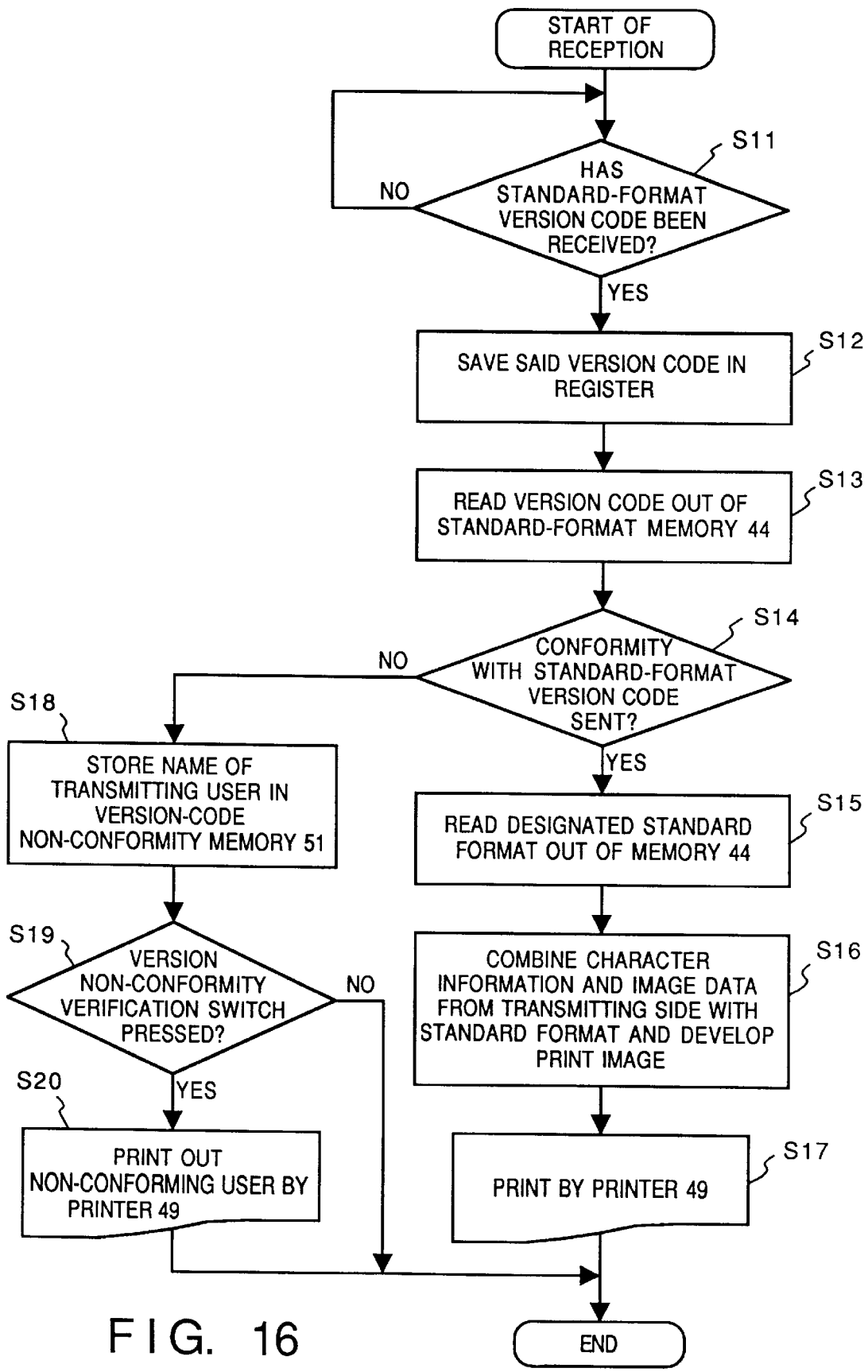
FIG. 16 is a flowchart showing operation on the receiving side according to the second embodiment.

FIG. 16 is a flowchart showing the receiving operation described above. Step S11 of the flowchart calls for a determination as to whether the standard-format version code has been received. If the answer is YES, then the program proceeds to step S12, where the version code is saved in the register of the CPU 36. Then, at step S13, the version code is read out of the standard-format memory 44 and a check is performed at step S14 to determine whether it agrees with the sent version code. If the answer at step S14 is YES, the program proceeds to step S15, at which the standard format of this version code is read out, and then to step S16, at which the character information and the image data are received from the transmitting side are combined with the standard format and developed into a print image. Then, at step S17, the print image developed by the printer 49 is printed.

If it is found at step S14 that the version codes do not coincide (i.e., if a NO answer is obtained at this step), the program proceeds to step S18, at which the name of the transmitting user is stored in the version-code non-conformity memory 51. This is followed by step S19, at which it is determined whether the version non-conformity verification switch SW4 on the control panel 41 has been pressed. If the answer is NO, processing ends. If a YES answer is received, the program proceeds to step S20, at which the name of the non-conforming transmitting user is printed out by the printer 49.

Third Embodiment

A third embodiment according to the present invention will now be described with reference to the drawings.

Figure 17A:
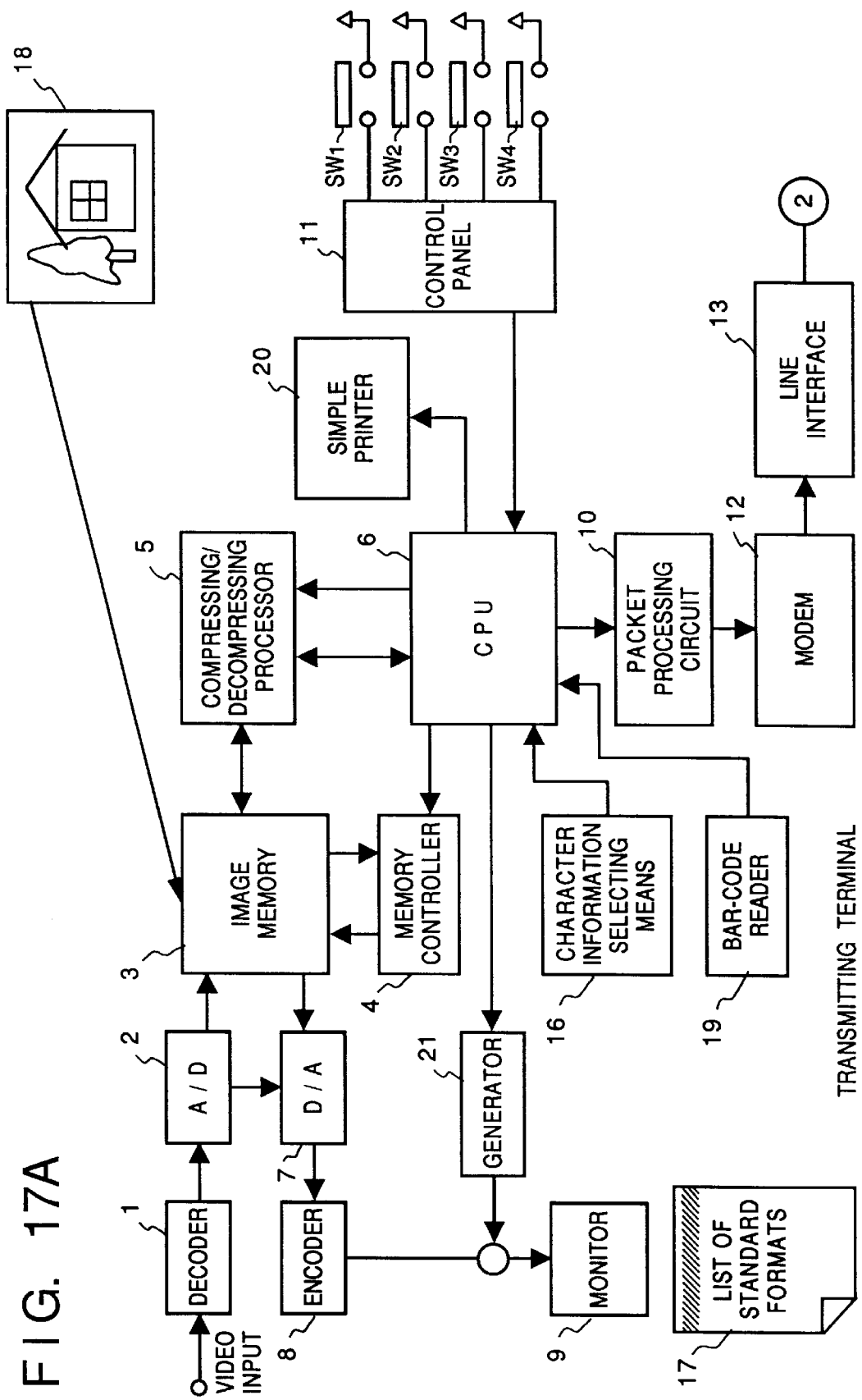

FIGS. 17A and 17B are block diagrams showing a still-picture transmission system according to a third embodiment of the present invention. Components identical with those in the foregoing embodiments are designated by like reference numerals and need not be described again. Numeral 20 denotes a simple printer for receiving the standard-format file from the receiving side and performing a simple print of the same, and numeral 21 denotes a character generator.

The transmitting and receiving operations in this embodiment constructed as set forth above will be described in accordance with FIGS. 18 and 19. The writing of a transmission image and the method of inputting character information are as described earlier in the second embodiment.

Figure 18:
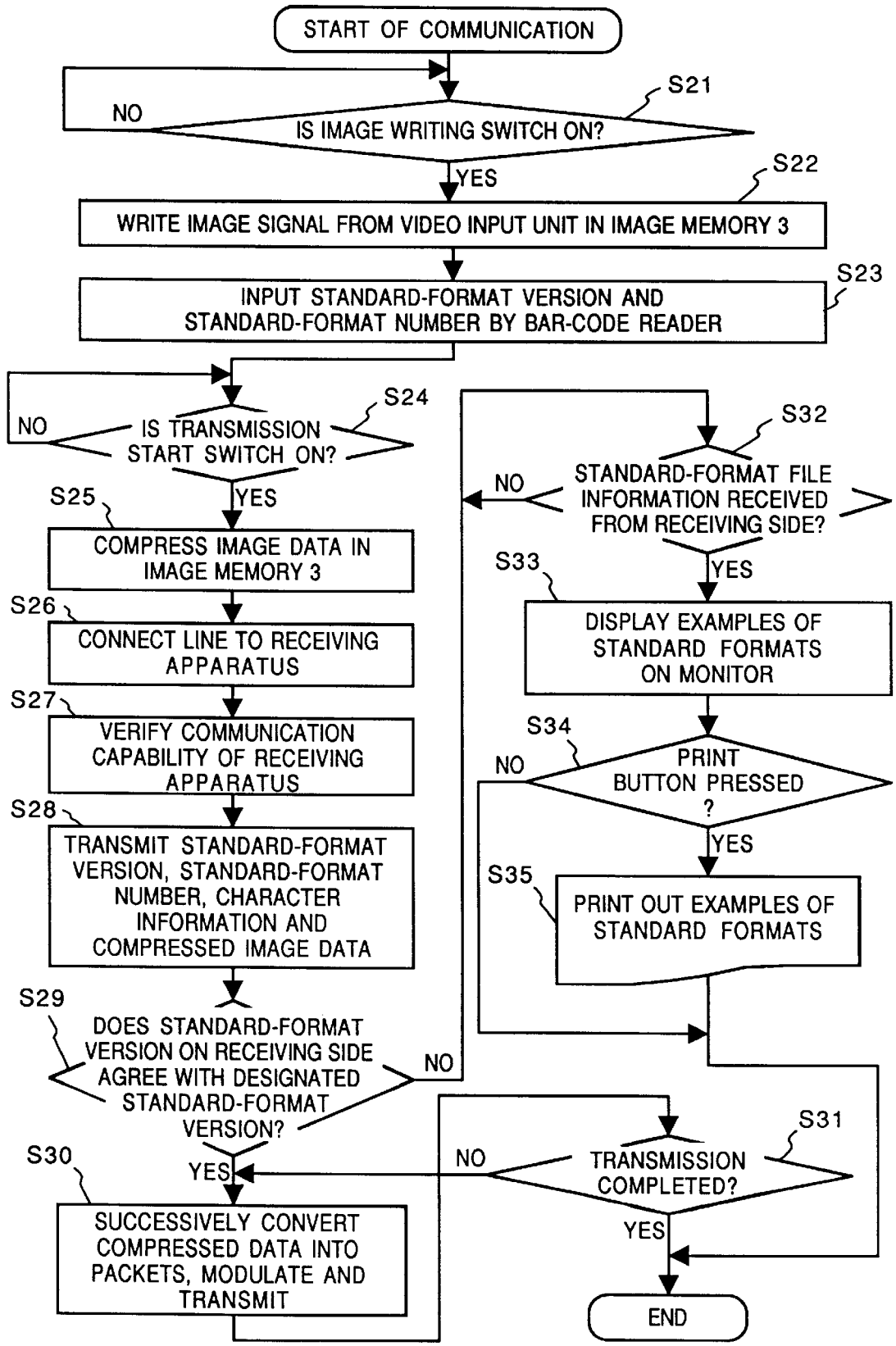
FIG. 18 is a flowchart showing operation on the transmitting side according to the third embodiment.
Figure 19:
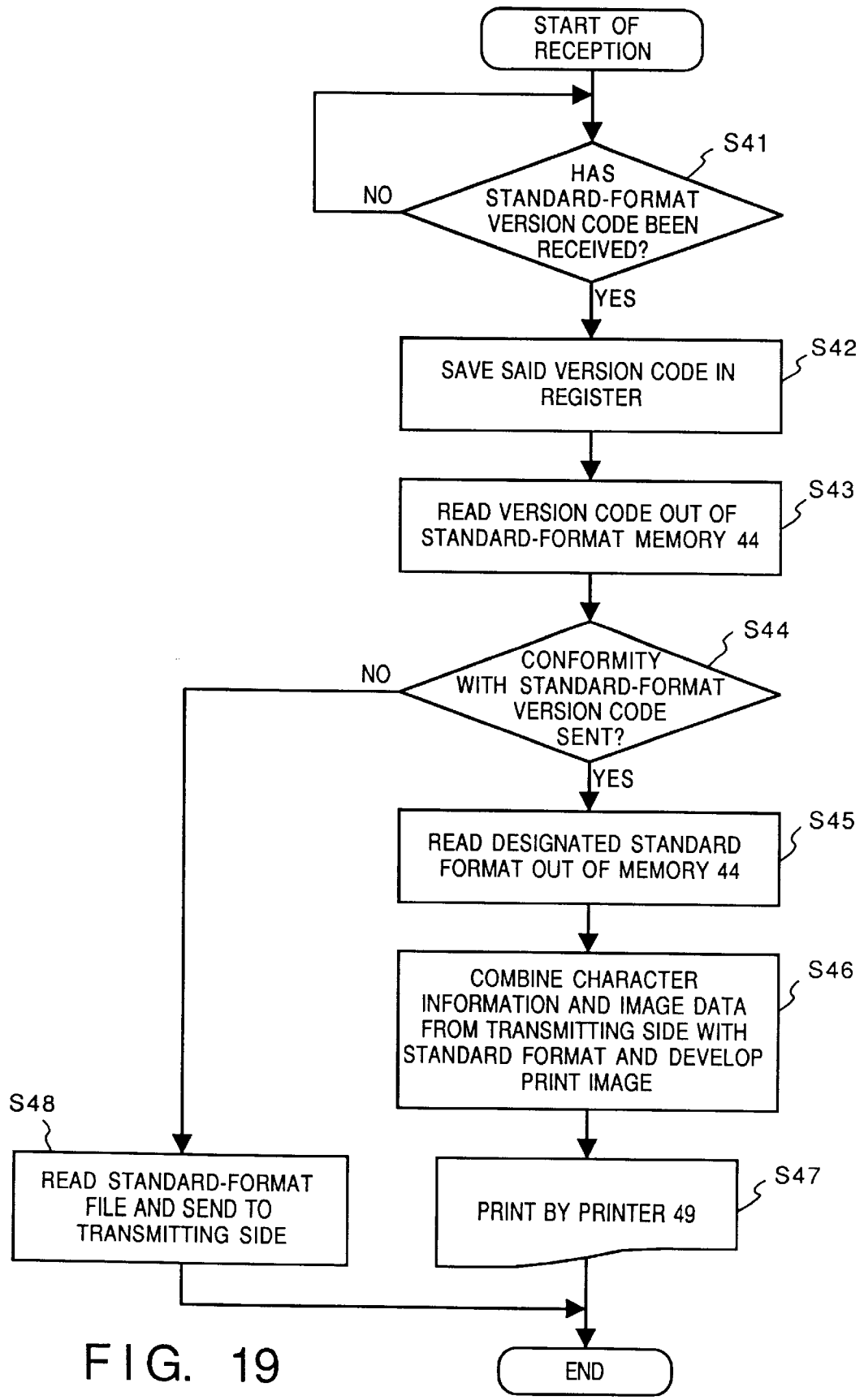
FIG. 19 is a flowchart showing operation on the receiving side according to the third embodiment.

FIG. 18 is a flowchart showing the operation on the transmitting side. Step S21 calls for a determination as to whether a write switch (SW1) on the control panel 11 has been operated. If the answer received at this step is YES, then the program proceeds to step S22, at which the memory controller 4 is instructed to write the image signal from the video input unit to the image memory 3. Next, at step S23, the standard-format version and the standard-format number are inputted from the bar-code reader 19, and then it is determined at step S24 whether the transmission start switch has been turned on. If the answer is YES, the program proceeds to step S25, at which the image data in the image memory 3 is compressed by the compressing/decompressing processor 5, and then to step S26, at which the line is connected to the receiving side via the line interface 13. This is followed by step S27, at which a negotiation is performed with the receiving apparatus and the communication capacity of the other party's apparatus is verified. The standard-format version and the standard-format number are transmitted at step S28.

The standard-format version on the receiving side and the designated standard-format version are checked at step S29 to determine whether they coincide. If the answer is YES, then the program proceeds to step S30, at which the compressed image data is successively converted into packets by the packet processing circuit 10, modulated by the modem 12 and transmitted via the line interface 13. It is determined at step S31 whether transmission has been completed. If the answer is NO, then the foregoing processing is repeated. When the transmission is subsequently completed, the transmission processing is terminated. If non-conformity (NO) is found at step S29, then the program proceeds to step S32, at which it is determined whether the standard-format file information has been received from the receiving side. If the answer is YES, then the program proceeds to step S33. Here the outline of the received standard format whose version has been updated is displayed on the monitor 9, a character code whose content has undergone version updating is sent to the character generator 21, and this is displayed in a form superimposed upon the outline of the example of the standard format displayed earlier. Next, at step S34, it is determined whether a print switch (SW3) on the control panel 11 has been pressed. If the answer is NO, then processing is terminated. If the switch has been pressed, on the other hand, the program proceeds to step S35, at which the example of the received standard format is printed by the simple printer 20.

The operation on the receiving side will be described in accordance with the flowchart shown in FIG. 19. As shown in FIG. 19, the processing from step S41 to step S47 is the same as the processing from step S11 to step S17 illustrated in FIG. 16. A case in which the standard formats do not coincide (NO at step S44) will be described.

If it is found at step S44 that the standard-format version and the standard-format number that have been sent do not agree with the version codes in the standard-format memory 44, the program proceeds to step S48, at which the standard-format file information is read out of the standard-format memory 44 and sent to the transmitting side.

In accordance with the second and third embodiments described above, character information and a selection code for a standard print format, which has been stored on the receiving side, are appended to a video image from the transmitting side and the resulting signal is transmitted to the receiving side, whereby it is possible for the receiving side to automatically lay out a color natural image and character information from the transmitting side in a standard format that is in accordance with the selected format, and print out the result. Furthermore, the print automatically printed out can be utilized in business on the receiving side without any further revision. Even if the registration of standard format is updated on the receiving side, any non-conformity between the transmitting and receiving sides can be verified promptly. A non-conforming user can be provided with a display of version update information or a list of standard formats can be updated by the user. The information can be printed out by the user to eliminate any user inconvenience.

Modification

In the second and third embodiments, the standard-format memory 44, the human-image data memory 45 (which stores the image of the person in charge) and the version non-conformity memory 51 are provided separately. However, the effects would be entirely the same even if the same memory medium were used.

Further, in the second and third embodiments, a print-out is obtained from the printer 49 by operating the non-conformity verification switch SW4. However, the same effects would be obtained even if character dot data indicative of a person's name from an image retrieval code were developed in the image memory 33 and outputted to a monitor, by way of example.

The line in the first through third embodiments need not be an ISDN. Operation would be the same and the same effects would be obtained if a conventional analog line were used.

Further, in each of the foregoing embodiments, the printer shown in FIG. 9 is described as an example of the output unit on the receiving side. However, this does not impose a limitation upon the invention, for a color display or the like may be used. Any means will suffice so long as the received data is capable of being observed as a visible image.

It should be noted that the present invention may be applied to a system composed of a plurality of devices or to an apparatus comprising one device. It goes without saying that the present invention can be applied also to a case where the above-mentioned effects are attained by supplying a program to a system or apparatus.

Thus, in accordance with the embodiments described above, it is possible to provide a highly versatile color communication apparatus and method in which the apparatus is improved and convenience for the user enhanced.

As many apparently widely different embodiments of the present invention can be made without departing from the spirit and scope thereof, it is to be understood that the invention is not limited to the specific embodiments thereof except as defined in the appended claims.

What is claimed is:

1. A color communication apparatus comprising:

output means for outputting a plurality of predetermined standard formats to a display means as an image representing a figure of said predetermined standard formats;

designating means for manually designating a desired standard format, including predetermined item information, from among the plurality of predetermined standard formats displayed on the display means;

generating means for generating color image data located in the designated standard format including predetermined item information; and transmitting means for transmitting data that designates the standard format including predetermined item information designated by said designating means and the color image data generated by said generating means, without transmitting the designated format, the transmitted data being indicative of at least one of a plurality of predetermined standard formats prestored in a communication apparatus which is a destination of the transmitted data.

2. The apparatus according to claim 1, wherein the data that designates said standard format including predetermined item information includes data that designates the color of the standard format.

3. A color communication method for generating a designated standard format in which elements are allocated, from a plurality of predetermined standard formats in which elements are allocated, combining the generated standard format with color image data, and outputting the result, comprising:

a receiving step of receiving the designating information;

a comparing step of comparing the designating information received at said receiving step with a version of a standard format, in which elements are allocated, that has been registered; and a notifying step of given notification of non-agreement between the compared information and the version when this non-agreement occurs at said comparing step.

4. Method according to claim 3, wherein the data that designates said standard format in which elements are allocated includes data that designates the color of the standard format in which elements are allocated.

5. Method according to claim 3, wherein an image conforming to a transmitted specific character code is retrieved from a data base and the retrieved image is outputted together with said standard format in which elements are allocated.

6. The method according to claim 3, wherein a character image conforming to a transmitted specific character code is retrieved from a data base, the retrieved character image is converted into a font pattern, and the font pattern is outputted together with said standard format in which elements are allocated.

7. A color communication method comprising:

an output step of outputting a plurality of predetermined standard formats to a display means as an image representing a figure of said predetermined standard formats;

a designating step of manually designating a desired standard format, including predetermined item information, from among the plurality of predetermined standard formats displayed on the display means;

a generating step of generating color image data located in the designated standard format including predetermined item information;

a transmitting step of transmitting data that designates the standard format including predetermined item information designated at said designating step, and the color image data generated at said generating step, without transmitting the designated format;

a receiving step of receiving the data that designates a standard format including predetermined item information designated at said designating step and the color image data located in said standard format, without receiving the designated format; and a reading step of reading the standard format including predetermined item information out of a memory medium in dependence upon the designating data, locating the color image data in said standard format including predetermined item information, and outputting the result.

8. The method according to claim 7, wherein the data that designates said standard format including predetermined item information includes data that designates the color of the standard format.

9. The method according to claim 7, wherein an image conforming to a transmitted specific character data is retrieved from a data base and the retrieved image is outputted together with said standard format including predetermined item information.

10. The method according to claim 7, wherein a character image conforming to a transmitted specific character code is retrieved from a data base, the retrieved character image is converted into a font pattern and the font pattern is outputted together with said standard format.

11. A color communication apparatus for generating a designated standard format including predetermined item information, from a plurality of predetermined standard formats including predetermined item information, combining the generated standard format with color image data, and outputting the result, comprising:

receiving means for receiving designating information that designates a standard format including predetermined item information;

comparing means for comparing the designating information from said receiving means with a version a standard format including predetermined item information that has been registered; and notifying means which, when an output from said comparing means indicates non-agreement between the compared information and the version, gives notification of this non-agreement.

12. The apparatus according to claim 11, wherein the data that designates said standard format including predetermined item information includes data that designates the color of the standard format.

13. The apparatus according to claim 11, wherein an image conforming to a transmitted specific character data is retrieved from a data base and the retrieved image is outputted together with said standard format including predetermined item information.

14. The apparatus according to claim 11, wherein a character image conforming to a transmitted specific character code is retrieved from a data base, the retrieved character image is converted into a font pattern and the font pattern is outputted together with said standard format.

15. A color communication apparatus for generating a designated standard formats in which elements are allocated, from a plurality of predetermined standard formats in which elements are allocated, combining the generated standard format with color image data, and outputting the result, comprising:

receiving means for receiving designating information that designates a standard format in which elements are allocated;

comparing means for comparing the designating information from said receiving means with a version of a standard format, in which elements are allocated, that has been registered; and notifying means which, when an output from said comparing means indicates non-agreement between the compared information and the version, gives notification of this non-agreement.

16. Apparatus according to claim 15, wherein the data that designates said standard format in which elements are allocated includes data that designates the color of the standard format.

17. Apparatus according to claim 15, wherein an image conforming to a transmitted specific character data is retrieved from a data base and the retrieved image is outputted together with said standard format in which elements are allocated.

18. Apparatus according to claim 15, wherein a character image conforming to a transmitted specific character code is retrieved from a data base, the retrieved character image is converted into a font pattern, and the font pattern is outputted together with said standard format.

19. A color communication method comprising:

an output step of outputting a plurality of predetermined standard formats to a display means as an image representing a figure of said predetermined standard formats;

a designating step of manually designating a desired standard format, in which elements are allocated, from among the plurality of predetermined standard formats displayed on the display means;

a generating step of generating color image data located in the designated standard format in which elements are allocated;

a transmitting step of transmitting data that designates the standard format, in which elements are allocated, designated at said designating step and the color image data generated at said generating step, without transmitting the standard format;

a receiving step of receiving the data that designates a standard format, in which elements are allocated, designated at said designating step and the color image data located in said standard format, without receiving the standard format; and a reading step of reading the standard format, in which elements are allocated, out of a memory medium in dependence upon the designating data, locating the color image data in said standard format in which elements are allocated, and outputting the result.

20. The method according to claim 19, wherein the data that designates said standard format in which elements are allocated includes data that designates the color of the standard format.

21. The method according to claim 19, wherein an image conforming to a transmitted specific character data is retrieved from a data base and the retrieved image is outputted together with said standard format in which elements are allocated.

22. The method according to claim 19, wherein a character image conforming to a transmitted specific character code is retrieved from a data base, the retrieved character image is converted into a font pattern, and the font pattern is outputted together with said standard format.

23. A color communication apparatus comprising:

output means for outputting a plurality of predetermined standard formats to a display means as an image representing a figure of said predetermined standard formats;

designating means for manually designating a desired standard format, in which elements are allocated, from among the plurality of predetermined standard formats displayed on the display means;

generating means for generating color image data located in the designated standard format in which elements are allocated; and transmitting means for transmitting data that designates the standard format, in which elements are allocated, designated by said designating means and the color image data generated by said generating means, without transmitting the designated standard format, the transmitted data being indicative of at least one of a plurality of predetermined standard formats prestored in a communication apparatus which is a destination of the transmitted data.

24. Apparatus according to claim 23, wherein the data that designates said standard format in which elements are allocated includes data that designates the color of the standard format.

* * * * *

UNITED STATES PATENT AND TRADEMARK OFFICE
CERTIFICATE OF CORRECTION

PATENT NO. : 5,937,086

DATED : August 10, 1999

INVENTOR(S) : Tomishige TAGUCHI

It is certified that error appears in the above-identified patent and that said Letters Patent is hereby corrected as shown below:

ON THE COVER:

Section [76] Inventor:

"[76] Inventor:
    Tomishige Taguchi; c/o Canon Kabushiki Kaisha, 30-2, Shimomaruko 3-chome, Ohta-ku, Tokyo, Japan"
should read --[75] Inventor:
    Tomishige Taguchi, Urawa, Japan--.

UNITED STATES PATENT AND TRADEMARK OFFICE
CERTIFICATE OF CORRECTION

PATENT NO. : 5,937,086

DATED : August 10, 1999

INVENTOR(S) : Tomishige TAGUCHI

Page 2 of 3

It is certified that error appears in the above-identified patent and that said Letters Patent is hereby corrected as shown below:

ON THE COVER:

After Section [75]
Insert the following Section:

--[73] Assignee: Canon Kabushiki Kaisha,
            Tokyo, Japan--.

Before Section [57]
Insert the following Section:

--[56] Attorney, Agent, or Firm:
       Fitzpatrick, Cella, Harper & Scinto--.

COLUMN 2:

Line 36, "blocks diagram" should read --block diagrams--; and
Line 48, "blocks diagram" should read --block diagrams--.

UNITED STATES PATENT AND TRADEMARK OFFICE
CERTIFICATE OF CORRECTION

PATENT NO. : 5,937,086
DATED : August 10, 1999
INVENTOR(S) : Tomishige TAGUCHI

It is certified that error appears in the above-identified patent and that said Letters Patent is hereby corrected as shown below:

COLUMN 3:

Line 47, "with in" should read --in--.

COLUMN 4:

Line 58, "inputs" should read --input--.

COLUMN 5:

Line 34, "is charge" should read --in charges--.

Signed and Sealed this

Fourth Day of July, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,937,086
DATED : August 10, 1999
INVENTOR(S) : Tomishige Taguchi

It is certified that error appears in the above-identified patent and that said Letters Patent is hereby corrected as shown below:

<u>Title page,</u>
Item [76], Inventor,
"[76] Inventor: Tomishige Taguchi; c/o Canon
 Kabushiki Kaisha, 30-2, Shimomaruko
 3-chome, Ohta-ku, Tokyo, Japan"
should read
-- [75] Inventor: Tomishige Taguchi, Urawa, Japan --.

After Item [75], insert the following item:
-- [73] Assignee: Canon Kabushiki Kaisha,
 Tokyo, Japan --.

Before Item [57], insert the following item:
-- [74] *Attorney, Agent, or Firm*:
 Fitzpatrick, Cella, Harper & Scinto --

<u>Column 2,</u>
Line 36, "blocks diagram" should read -- block diagrams --; and
Line 48, "blocks diagram" should read -- block diagrams --.

<u>Column 3,</u>
Line 47, "with in" should read -- in --.

<u>Column 4,</u>
Line 58, "inputs" should read -- input --.

UNITED STATES PATENT AND TRADEMARK OFFICE
CERTIFICATE OF CORRECTION

PATENT NO.    : 5,937,086
DATED         : August 10, 1999
INVENTOR(S)   : Tomishige Taguchi It is certified that error appears in the above-identified patent and that said Letters Patent is hereby corrected as shown below:

Column 5,
Line 34, "is charge" should read -- in charges --.

Column 13,
Line 47, "formats" should read -- format, --.

Signed and Sealed this

Fourth Day of February, 2003

JAMES E. ROGAN
*Director of the United States Patent and Trademark Office*